US011802017B2

(12) United States Patent
Yamada et al.

(10) Patent No.: US 11,802,017 B2
(45) Date of Patent: Oct. 31, 2023

(54) ULTRASONIC APPARATUS, DETECTION APPARATUS, AND PRINTING APPARATUS

(71) Applicant: SEIKO EPSON CORPORATION, Tokyo (JP)

(72) Inventors: Masayoshi Yamada, Chino (JP); Hikaru Iwai, Matsukawa-machi (JP); Shinya Yamazaki, Shiojiri (JP); Osamu Murayama, Yamagata-mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 369 days.

(21) Appl. No.: 17/106,482

(22) Filed: Nov. 30, 2020

(65) Prior Publication Data

US 2021/0163245 A1 Jun. 3, 2021

(30) Foreign Application Priority Data

Nov. 29, 2019 (JP) ................. 2019-216439

(51) Int. Cl.
| | |
|---|---|
| *B65H 7/12* | (2006.01) |
| *B65H 7/06* | (2006.01) |
| *G01B 17/00* | (2006.01) |
| *B65H 3/06* | (2006.01) |
| *B65H 5/36* | (2006.01) |

(52) U.S. Cl.
CPC ............. *B65H 7/06* (2013.01); *B65H 3/06* (2013.01); *G01B 17/00* (2013.01); *B65H 5/36* (2013.01); *B65H 2511/22* (2013.01); *B65H 2511/522* (2013.01); *B65H 2553/30* (2013.01); *B65H 2553/82* (2013.01); *B65H 2557/23* (2013.01)

(58) Field of Classification Search
CPC . B65H 7/125; B65H 7/12; B65H 7/06; B65H 2553/30; B65H 2511/521; B65H 2511/522
See application file for complete search history.

(56) References Cited

U.S. PATENT DOCUMENTS

| | | |
|---|---|---|
| 2002/0079644 A1 | 6/2002 | Phinney |
| 2016/0255225 A1 | 9/2016 | Yamamoto et al. |
| 2017/0283200 A1* | 10/2017 | Nakagawa ............... B65H 1/14 |

FOREIGN PATENT DOCUMENTS

| | | |
|---|---|---|
| CN | 206269834 U | 6/2017 |
| JP | H0597282 A | 4/1993 |
| JP | 2002211797 A | 7/2002 |
| JP | 2016159986 A | 9/2016 |
| JP | 2017208588 A | 11/2017 |

* cited by examiner

*Primary Examiner* — Luis A Gonzalez
(74) *Attorney, Agent, or Firm* — CHIP LAW GROUP

(57) ABSTRACT

An ultrasonic apparatus includes a first ultrasonic sensor that transmits an ultrasonic wave to an object and receives the ultrasonic wave reflected by the object, a second ultrasonic sensor that transmits an ultrasonic wave to the object and receives the ultrasonic wave reflected by the object, an determination circuit that outputs an error signal when the difference between a first distance between the first ultrasonic sensor and the object calculated based on ultrasonic wave transmission and reception processing using the first ultrasonic sensor and a second distance between the second ultrasonic sensor and the object calculated based on ultrasonic wave transmission and reception processing using the second ultrasonic sensor is equal to or greater than a threshold value.

15 Claims, 15 Drawing Sheets

ULTRASONIC APPARATUS, DETECTION APPARATUS, AND PRINTING APPARATUS

The present application is based on, and claims priority from JP Application Serial Number 2019-216439, filed Nov. 29, 2019, the disclosure of which is hereby incorporated by reference herein in its all.

BACKGROUND

1. Technical Field

The present disclosure relates to an ultrasonic apparatus, a detection apparatus, and a printing apparatus.

2. Related Art

In the related art, there is known a detection apparatus that detects an abnormality such as wrinkles in a sheet by using ultrasonic waves (see, for example, JP-A-2002-211797). The detection apparatus described in JP-A-2002-211797 transmits ultrasonic waves to a sheet from an ultrasonic transmission apparatus, and receives the ultrasonic waves that passed through the sheet by an ultrasonic reception apparatus. In this detection apparatus, the drive signal input to the ultrasonic transmission apparatus is compared with the reception signal output from the ultrasonic reception apparatus, and the change in the inclination angle of the sheet caused by the wrinkles of the sheet is detected by using a phase shift.

However, the position of the wrinkles occurring on the sheet, the shape of the wrinkles, the size of the wrinkles, and the like vary depending on the material of the sheet, the method of transporting the sheet, the ambient environment such as humidity, and the position of the wrinkles that occur has various patterns. For example, in a transport apparatus that transports a sheet, there are wrinkles and the like that occur only in the upstream of the conveyance and less likely occur in the downstream. In the wrinkle detection apparatus of JP-A-2002-211797 described above, since only one pair of an ultrasonic transmission apparatus and an ultrasonic reception apparatus are provided, for example, it is difficult to detect wrinkles that occur in the upstream of the sheet and are less likely to occur in the downstream of the sheet. Further, when the wrinkles are formed over a wide range, the inclination of the sheet becomes gentle, and it is difficult to detect the wrinkles by using the phase shift from the comparison between the drive signal and the received signal. The above is described with respect to the wrinkles of the sheet, but the same applies the case where an object other than a sheet is used as an object and abnormalities such as unevenness and the like on the object are detected, and even if ultrasonic waves are transmitted/received to/from only one predetermined location of the object, the abnormality of the object may not be detected in some cases.

SUMMARY

An ultrasonic apparatus according to a first aspect includes a first ultrasonic sensor that transmits a ultrasonic wave to an object and receives the ultrasonic wave reflected by the object, a second ultrasonic sensor that transmits an ultrasonic wave to the object and receives the ultrasonic wave reflected by the object, an error output portion that outputs an error signal when the difference between a first distance between the first ultrasonic sensor and the object calculated based on ultrasonic wave transmission and reception processing using the first ultrasonic sensor and a second distance between the second ultrasonic sensor and the object calculated based on ultrasonic wave transmission and reception processing using the second ultrasonic sensor is equal to or greater than a threshold value.

A detection apparatus according to a second aspect includes the ultrasonic apparatus according to the first aspect, and a detector that detects an abnormality of the object based on the error signal output from the ultrasonic apparatus.

A printing apparatus according to a third aspect includes a detection apparatus according to the second aspect and a printer that forms an image on the object, and controls printing by the printer based on a detection result of the abnormality by the detector.

DESCRIPTION OF EXEMPLARY EMBODIMENTS

First Embodiment

A first embodiment will be described below.
Schematic Configuration of Printing Apparatus 100

Figure 1:
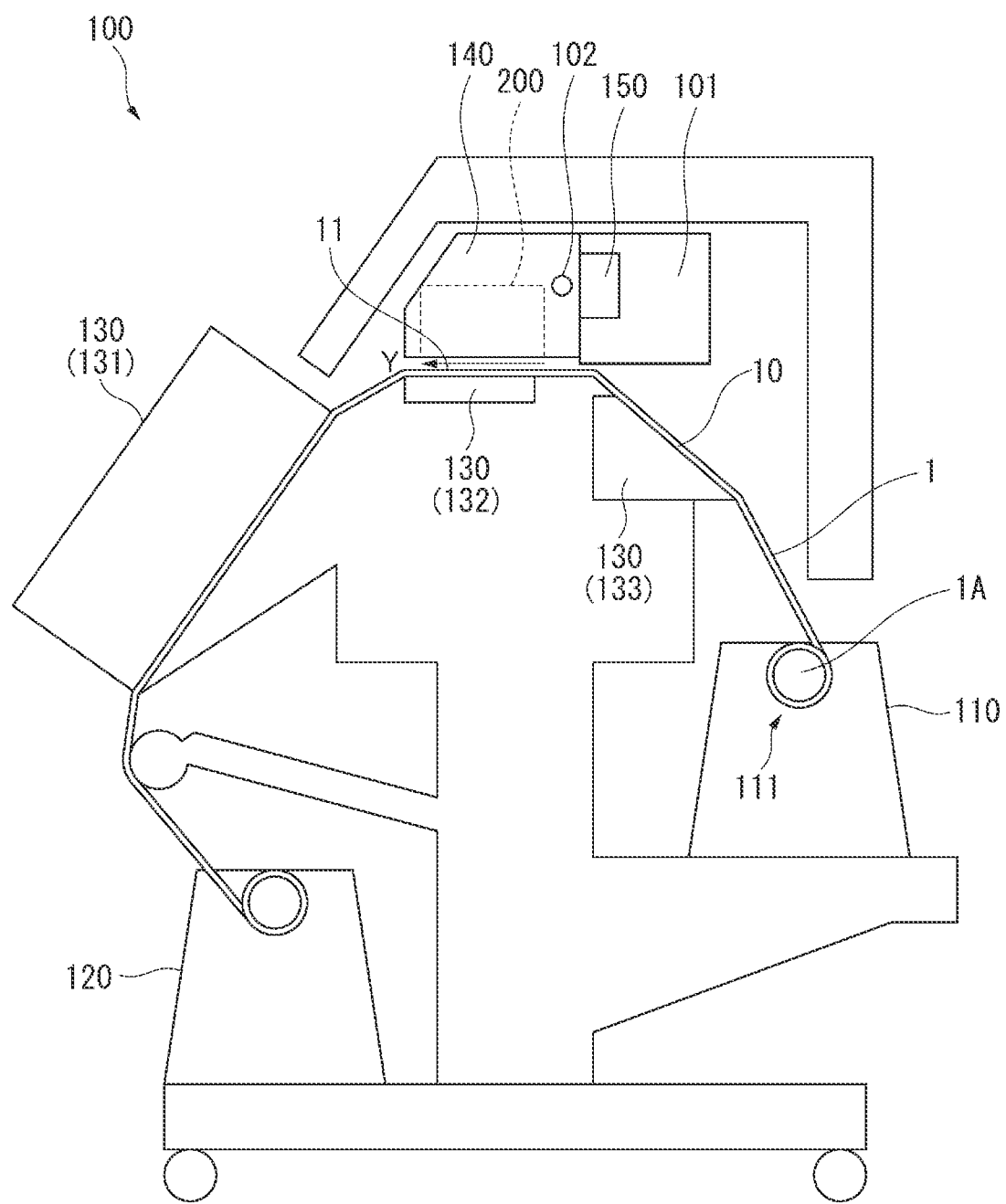
FIG. 1 is a schematic view showing a schematic configuration of a printing apparatus according to a first embodiment.
Figure 2:
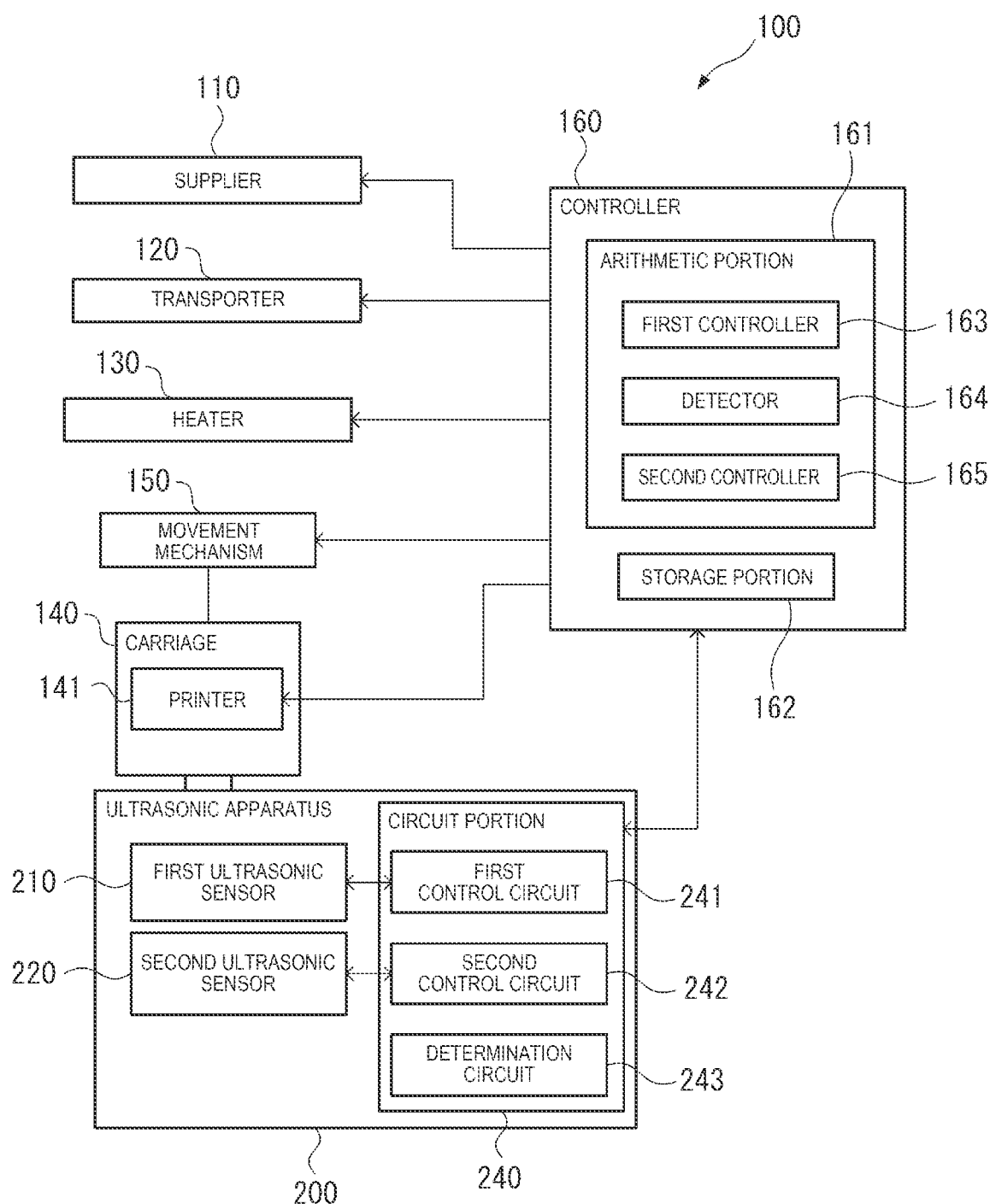
FIG. 2 is a block view showing a functional configuration of the printing apparatus according to the first embodiment.

FIG. 1 is a schematic view showing a schematic configuration of a printing apparatus 100 according to a first embodiment. FIG. 2 is a block view showing a functional configuration of the printing apparatus 100. The printing apparatus 100 according to the present embodiment is an apparatus that prints an image on a large-sized sheet 1 (object) such as a sign display. As shown in FIGS. 1 and 2, the printing apparatus 100 includes a supplier 110, a transporter 120, a heater 130, a carriage 140, a movement mechanism 150, and a controller 160 (see FIG. 2).

The supplier 110 is a section for supplying the sheet 1. In the example shown in FIG. 1, the supplier 110 is configured to supply the sheet 1 wound around a core material 1A to the inside of the apparatus. The supplier 110 includes, for example, a core material holder 111 that holds the core material 1A, and supplies the sheet 1 to the inside of the apparatus by rotating the core material holder 111. The configuration of the supplier 110 is not limited to the configuration shown in FIG. 1. For example, the sheets 1 placed on a tray or the like may be supplied to the inside of the apparatus one by one. In addition, the type of the sheet 1 supplied from the supplier 110 is not particularly limited, and various types of media such as a paper surface, a film, and a woven fabric can be used.

The transporter 120 constitutes a transport mechanism and transports the sheet 1 supplied from the supplier 110 along a transport path 10. In the example shown in FIG. 1, the transporter 120 transports the sheet 1 toward the downstream of the transport path 10 by winding the leading end of the sheet 1 supplied from the supplier 110. In such a configuration, it is possible to reversely transport the sheet 1 from the downstream to the upstream by reversing the winding direction of the transporter 120 and the supply direction of the supplier 110. The configuration of the transporter 120 is not limited to the configuration shown in FIG. 1. For example, the sheet 1 may be transported by rotating a plurality of transport rollers.

A platen 11 is provided at a portion of the transport path facing the carriage 140. The platen 11 corresponds to the disposition portion of the present disclosure, and in the present embodiment, ink is ejected from a printer 141 (see FIG. 2) a on the carriage 140 onto the sheet 1 transported on the platen 11. In addition, the transport direction (first direction) of the sheet 1 at a position facing the platen 11 in the transport path along which the sheet 1 is transported is defined as a Y direction.

The heater 130 includes a first heater 131, a second heater 132, and a third heater 133. The first heater 131 is disposed in the downstream of the platen 11 in the transport path 10 and heats the surface of the sheet 1. The second heater 132 is provided on the platen 11 and heats the back surface of the sheet 1. The first heater 131 and the second heater 132 are heaters for drying the ink ejected on the sheet 1. As shown in FIG. 1, the third heater 133 is disposed in the upstream of the platen 11 in the transport path 10 and heats the sheet 1 before being transported to the platen 11, thereby drying the sheet 1 to suppress the occurrence of wrinkles.

Figure 3:
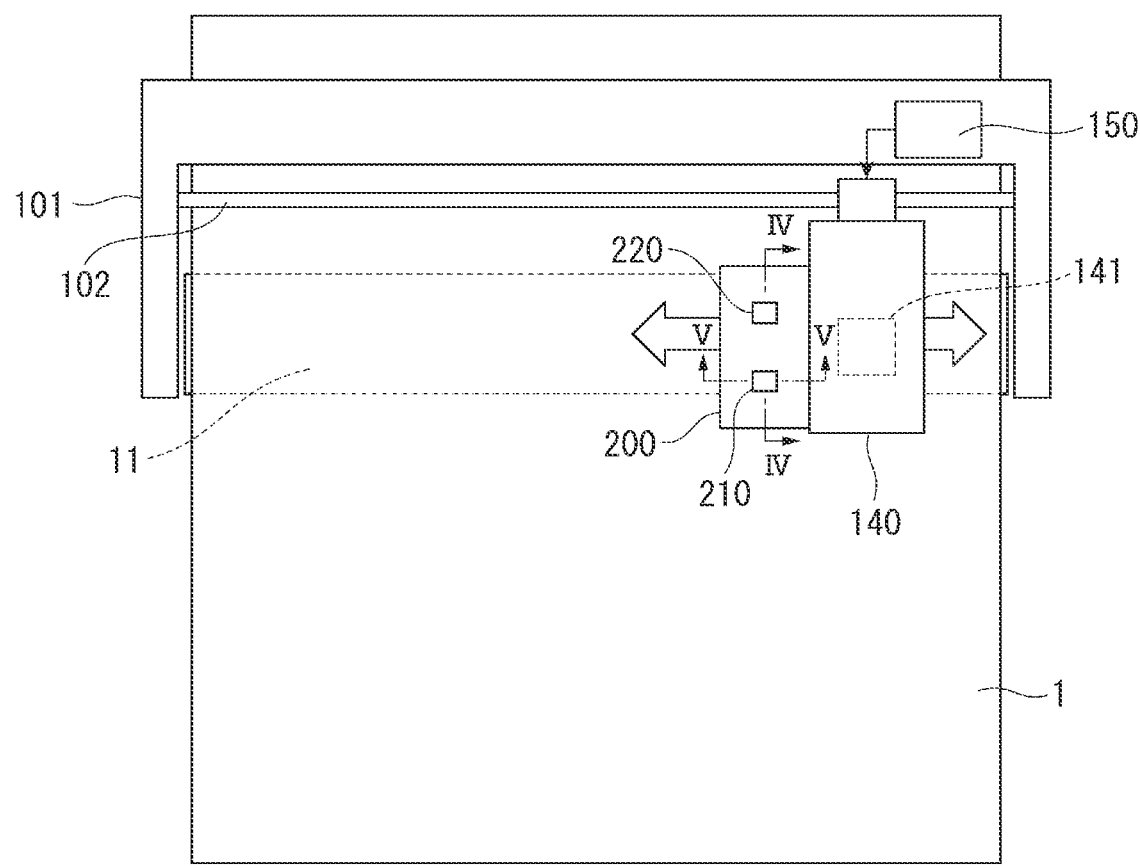
FIG. 3 is a schematic view showing a schematic configuration in the vicinity of a platen of the printing apparatus according to the first embodiment.

FIG. 3 is a schematic view showing a schematic configuration in the vicinity of the platen 11 of the printing apparatus 100. As shown in FIG. 3, the carriage 140 is provided at a position facing the platen 11. Further, the printing apparatus 100 is provided with a shaft 102 extending in an X direction orthogonal to the transport direction (Y direction) of the sheet 1 at a position facing the platen 11, and both ends of the shaft 102 are fixed to a frame 101 of the printing apparatus 100. Part of the carriage 140 is slidably engaged with the shaft 102, which allows the carriage 140 to move in the X direction. The printer 141 is mounted on the carriage 140, and an ultrasonic apparatus 200 is attached on the side surface of the carriage 140. The specific configurations of the printer 141 mounted on the carriage 140 and the ultrasonic apparatus 200 attached on the carriage 140 will be described later.

The movement mechanism 150 is an apparatus for moving the carriage 140 in the X direction based on a command from the controller 160. Although illustration of a specific configuration of the movement mechanism 150 is omitted, for example, a configuration including a timing belt disposed parallel to the shaft 102 and a drive motor for driving the timing belt can be exemplified. In such a configuration, it is possible to move the carriage 140 to a +X side by rotating the drive motor in the normal direction and to move the carriage 140 to a −X side by reversing the drive motor. The configuration of the movement mechanism 150 is not limited to the above, and may be any configuration as long as the movement mechanism 150 allows the carriage 140 to reciprocate in the X direction.

Next, the printer 141 mounted on the carriage 140 and the ultrasonic apparatus 200 attached on the carriage 140 will be described. As shown in FIG. 3, the carriage 140 of the present embodiment includes the printer 141. The ultrasonic apparatus 200 is fixed to the side surface of the carriage 140 on the +X side.
Configuration of Printer 141

The printer 141 has nozzles that individually eject ink in a portion facing the sheet 1 transported to the platen 11. A plurality of nozzles are provided corresponding to inks of a plurality of colors. For example, a piezo element is disposed in these nozzles, and by driving the piezo element, the ink droplets supplied from the ink tank are ejected from the nozzle.
Configuration of Ultrasonic Apparatus 200

Figure 4:
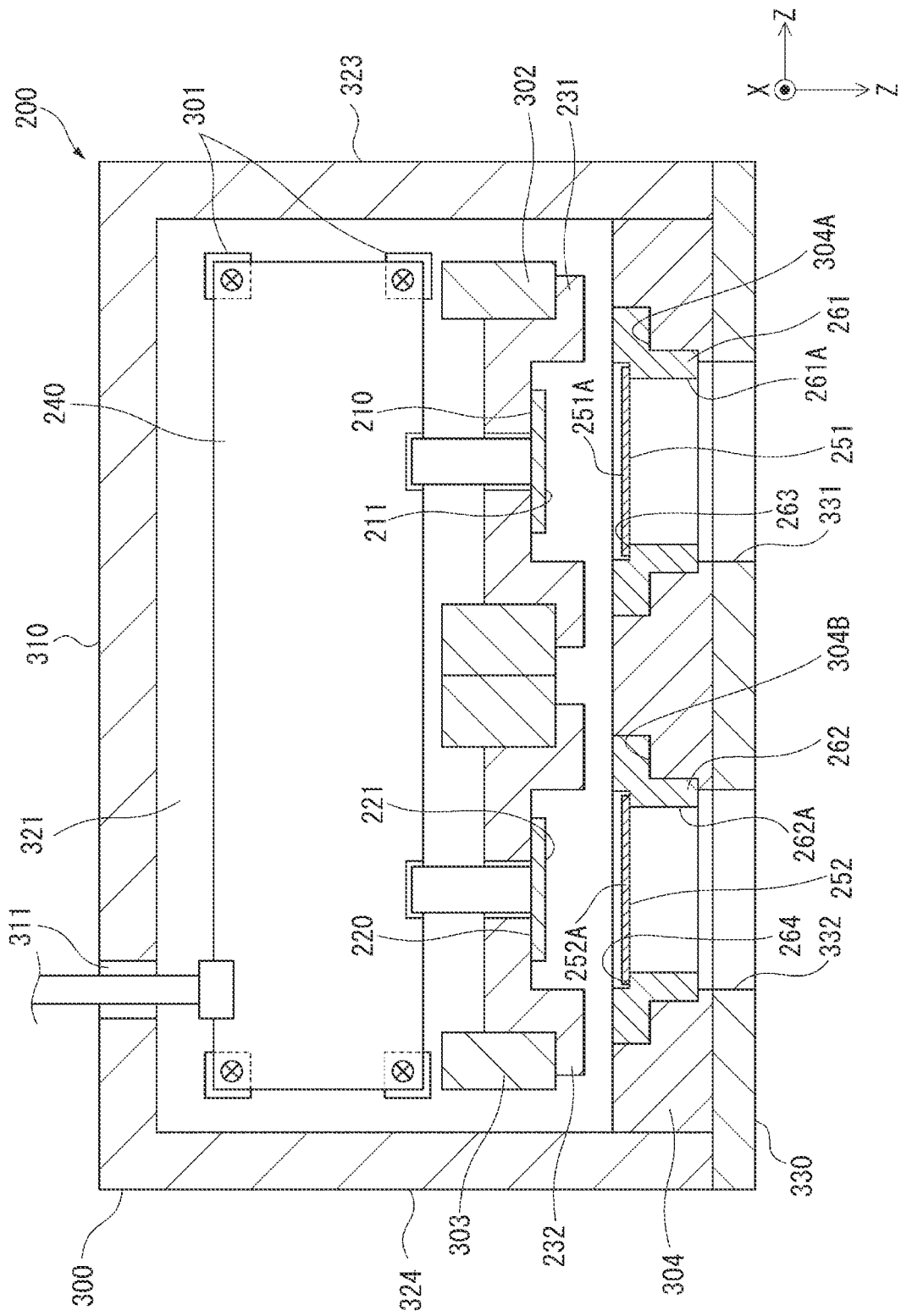
FIG. 4 is a cross-sectional view of an ultrasonic apparatus taken along the line IV-IV of FIG. 3.
Figure 5:
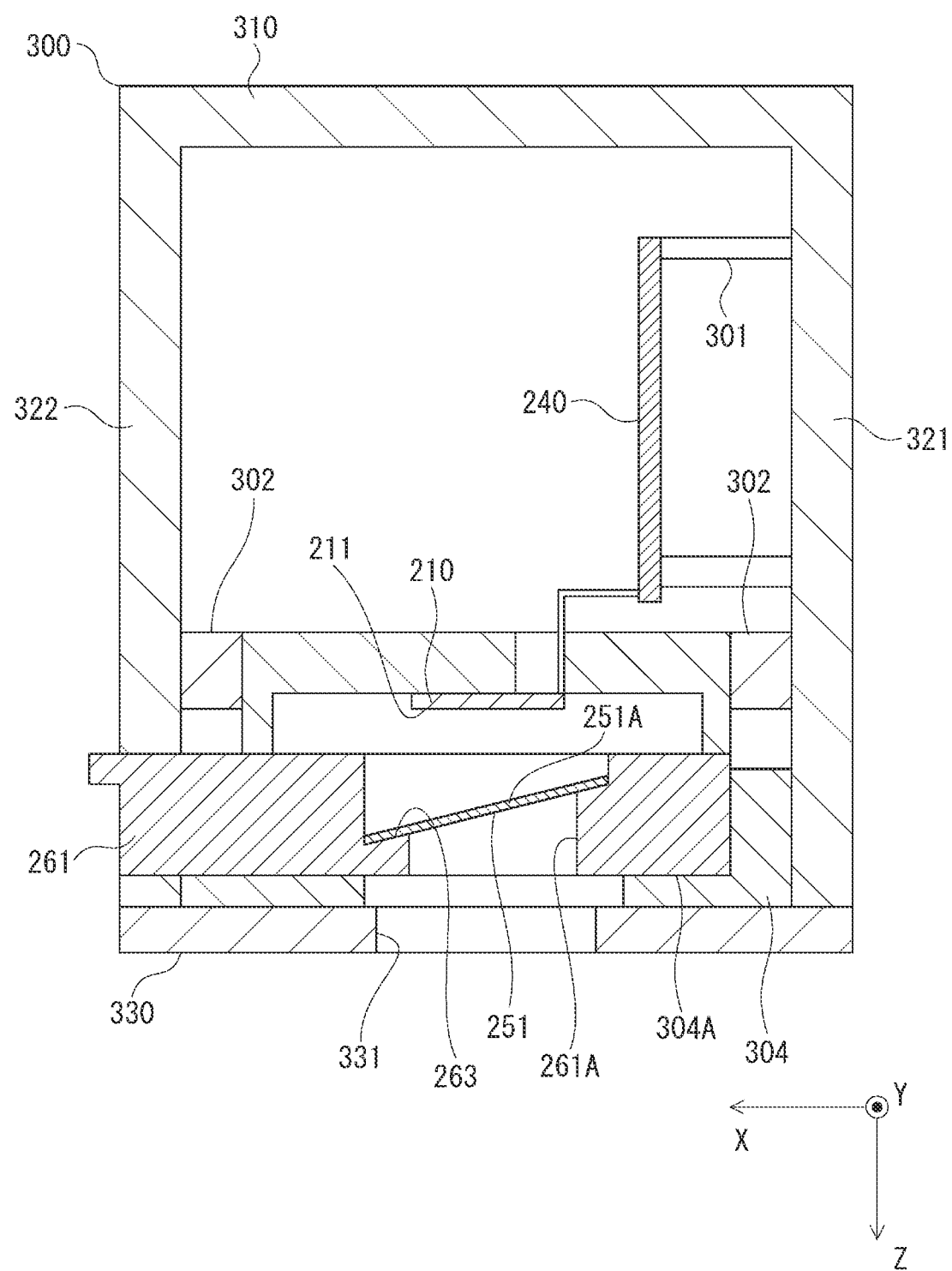
FIG. 5 is a cross-sectional view of the ultrasonic apparatus taken along the line V-V of FIG. 3.

FIG. 4 is a cross-sectional view of the ultrasonic apparatus 200 taken along the line IV-IV of FIG. 3, and FIG. 5 is a cross-sectional view of the ultrasonic apparatus 200 taken along the line V-V of FIG. 3. As shown in FIGS. 3 and 4, the ultrasonic apparatus 200 includes a first ultrasonic sensor 210, a second ultrasonic sensor 220, a first pedestal portion 231, a second pedestal portion 232, and a circuit board 240, a first protective member 251, a second protective member 252, a first holder 261, a second holder 262, and a shield member 300.
Configuration of Shield Member 300

The shield member 300 is a box-shaped member in which the first ultrasonic sensor 210, the second ultrasonic sensor 220, the first pedestal portion 231, the second pedestal portion 232, the circuit board 240, the first protective member 251, the second protective member 252, the first holder. 261, and the second holder 262 are provided. The outer shape of the shield member may be a rectangular parallelepiped, a cylindrical shape, or any other shape. In the present embodiment, an example in which the shield member 300 is formed in a rectangular parallelepiped shape is shown.

Specifically, the shield member 300 is made of a conductive material such as metal, and is formed in a container box shape having an opening on the side facing the platen 11.

That is, the shield member 300 includes a rectangular top surface portion 310 disposed on a −Z side, a first side surface portion 321, a second side surface portion 322, a third side surface portion 323, and a fourth side surface portion 324 rising from the edge of the top surface portion 310, and a rectangular bottom surface portion 330 disposed on a +Z side. The first side surface portion 321 and the second side surface portion 322 are side surfaces parallel to a ZY plane, and among the side surface portions, the first side surface portion 321 is fixed in contact with the +X side surface of the carriage 140. The third side surface portion 323 and the fourth side surface portion 324 are side surfaces parallel to a ZX plane, the third side surface portion 323 is disposed on the +Y side, and the fourth side surface portion 324 is disposed on the −Y side. Further, the bottom surface portion 330 is provided with a first opening window 331 and a second opening window 332 provided in the Y direction. The first opening window 331 and the second opening window 332 are through holes that communicate with the inside and the outside of the shield member 300. Such a shield member 300 may be configured by combining a plurality of parts. For example, the shield main body portion including the top surface portion 310, the first side surface portion 321, the second side surface portion 322, the third side surface portion 323, and the fourth side surface portion 324, and the bottom surface portion 330 may be detachably provided in the shield main body portion. Further, the shield main body portion may be formed by combining a first body including the first side surface portion 321 and a second body including the second side surface portion 322.

In the shield member 300 of the present embodiment, as shown in FIGS. 4 and 5, the circuit board 240 is disposed on the side of the first side surface portion 321 in the internal space of the shield member 300, the first ultrasonic sensor 210 is disposed facing the first opening window 331, and the second ultrasonic sensor 220 is disposed facing the second opening window 332. For example, as shown in FIGS. 4 and 5, the first side surface portion 321 is provided with a first fixing portion 301, and the circuit board 240 is fixed to the first fixing portion 301. Further, a second fixing portion 302 and a third fixing portion 303 are provided on the first side surface portion 321 and the second side surface portion 322. The first pedestal portion 231 to which the first ultrasonic sensor 210 is fixed is fixed to the second fixing portion 302, and the second pedestal portion 232 to which the second ultrasonic sensor 220 is fixed is fixed to the third fixing portion 303. In addition, the top surface portion 310 is provided with a wiring hole 311 through which a coupling wire that couples the circuit board 240 and the controller 160 is inserted.

Further, the shield member 300 includes a holder holding portion 304 between the second fixing portion 302 and the third fixing portion 303, and the bottom surface portion 330. The holder holding portion 304 includes a first engaging portion 304A that detachably engages the first holder 261 between the first ultrasonic sensor 210 and the first opening window 331, and a second engaging portion 304B that detachably engages the second holder 262 between the second ultrasonic sensor 220 and the second opening window 332. Then, the first holder 261 to which the first protective member 251 is fixed is held in the first engaging portion 304A, and the second holder 262 to which the second protective member 252 is fixed is held in the second engaging portion 304B. As a result, the first protective member 251 and the second protective member 252 are provided inside the shield member 300. Hereinafter, each configuration provided inside the shield member 300 will be described in detail.

Configuration of Ultrasonic Sensors 210 and 220

Figure 6:
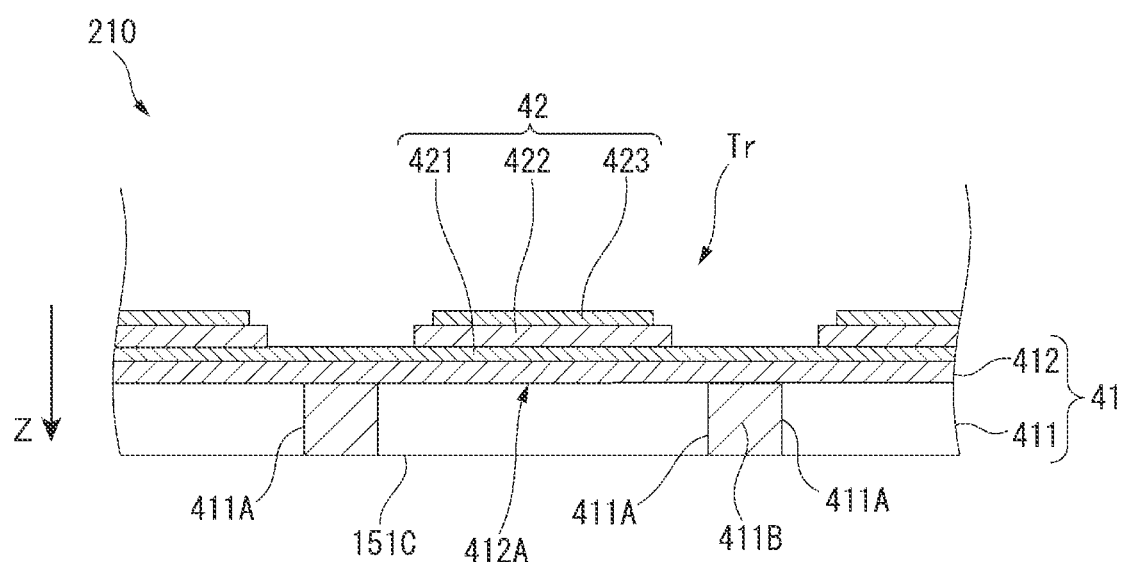
FIG. 6 is a cross-sectional view showing a schematic configuration of a first ultrasonic sensor of the first embodiment.

The first ultrasonic sensor 210 and the second ultrasonic sensor 220 are sensors that transmit ultrasonic waves toward the sheet 1 and receive ultrasonic waves reflected by the sheet 1. FIG. 6 is a cross-sectional view showing a schematic configuration of the first ultrasonic sensor 210. Since the first ultrasonic sensor 210 and the second ultrasonic sensor 220 have the same configuration, the configuration of the first ultrasonic sensor 210 will be described here, and the configuration of the second ultrasonic sensor 220 will be omitted.

As shown in FIG. 6, the first ultrasonic sensor 210 includes an element substrate 41 and a piezoelectric element 42. The element substrate 41 includes a substrate body portion 411 and a vibrating plate 412 provided on one surface side of the substrate body portion 411. Here, in the following description, the substrate thickness direction of the element substrate 41 is a Z direction. The Z direction is a transmission and reception direction in which ultrasonic waves are transmitted from the first ultrasonic sensor 210, and is a direction intersecting the X direction and the Y direction. The substrate body portion 411 is a substrate that supports the vibrating plate 412, and is made of a semiconductor substrate such as Si. The substrate body portion 411 is provided with an opening portion 411A that penetrates the substrate body portion 411 along the Z direction.

The vibrating plate 412 is made of $SiO_2$, a stacked body of $SiO_2$ and $ZrO_2$, or the like, and is provided on the −Z side of the substrate body portion 411. The vibrating plate 412 is supported by a partition wall 411B of the substrate body portion 411 that constitutes the opening 411A, and closes the −Z side of the opening 411A. A portion of the vibrating plate 412 that overlaps the opening portion 411A when viewed from the Z direction constitutes a vibrating portion 412A.

The piezoelectric element 42 is provided on the vibrating plate 412 and at a position overlapping each vibrating portion 412A when viewed from the Z direction. As shown in FIG. 6, the piezoelectric element 42 is configured by sequentially stacking a first electrode 421, a piezoelectric film 422, and a second electrode 423 on the vibrating plate 412.

Here, one vibrating portion 412A and the piezoelectric element 42 provided on the vibrating portion 412A constitute one ultrasonic transducer Tr. Although illustration is omitted, in the present embodiment, the first ultrasonic sensor 210 is configured by arranging such ultrasonic transducers Tr in a two-dimensional array structure.

In the first ultrasonic sensor 210, the piezoelectric film 422 expands and contracts when a pulse wave voltage of a predetermined frequency is applied between the first electrode 421 and the second electrode 423 of each ultrasonic transducer Tr. As a result, the vibrating portion 412A vibrates at a frequency according to the opening width of the opening portion 411A and the like, and ultrasonic waves are transmitted from the vibrating portion 412A toward the +Z side. Further, when the ultrasonic waves are input from the opening 411A, the vibrating portion 412A vibrates, and a potential difference is generated between the first electrode 421 side and the second electrode 423 side of the piezoelectric film 422. As a result, the first ultrasonic sensor 210 outputs a reception signal according to the potential difference generated in the piezoelectric film 422. In such a configuration, the +Z side surface of the element substrate 41 serves as an ultrasonic wave transmission and reception surface 211 of the first ultrasonic sensor 210.

As described above, the second ultrasonic sensor 220 has the same configuration as the first ultrasonic sensor 210. That is, the second ultrasonic sensor 220 is configured to include the element substrate 41 and the piezoelectric element 42, and the +Z side surface of the element substrate 41 is used as the ultrasonic wave transmission and reception surface 221 of the second ultrasonic sensor 220 to perform ultrasonic wave transmission and reception processing.

Configuration of Pedestal Portions 231 and 232

The first pedestal portion 231 has a flat surface facing the first opening window 331, and the first ultrasonic sensor 210 is fixed to the flat surface. Similarly, the surface of the second pedestal portion 232 facing the second opening window 332 is formed into a flat surface, and the second ultrasonic sensor 220 is fixed to the flat surface. As described above, the first pedestal portion 231 is fixed to the second fixing portion 302 of the shield member 300, and the second pedestal portion 232 is fixed to the third fixing portion 303 of the shield member 300. In the present embodiment, an example of fixing the first pedestal portion 231 and the second pedestal portion 232 to the second fixing portion 302 and the third fixing portion 303 provided on the first side surface portion 321 and the second side surface portion 322 of the shield member is shown, but is not limited to thereto. For example, the second fixing portion 302 and the third fixing portion 303 may be fixed to the circuit board 240 fixed to the shield member 300.

Configuration of Circuit Board 240

The circuit board 240 is disposed parallel or substantially parallel to the first side surface portion 321 and the second side surface portion 322. More specifically, the circuit board 240 is disposed such that the projected area of the circuit board 240 when projected onto a YZ plane is 70% or more of the area of the circuit board 240. The area of the circuit board 240 is the area of one surface orthogonal to the board thickness of the circuit board 240. That is, the angle formed between the board surface of the circuit board 240 and the YZ plane is 0° or more and 45° or less. With such a configuration, for example, the ultrasonic apparatus 200 can be downsized as compared with the case where the circuit board 240 is disposed parallel to the top surface portion 310 and the bottom surface portion 330. That is, in the present embodiment, the ultrasonic apparatus 200 on the +X side of the carriage 140 is fixed, and the carriage 140 can be moved in the X direction by the movement mechanism 150. In such a configuration, when the circuit board 240 is disposed parallel to an XY plane, the width of the ultrasonic apparatus 200 in the X direction increases, and the moving range of the carriage 140 decreases by the increased dimension, or the printing apparatus 100 may be increased in size. On the other hand, in the present embodiment, by disposing the circuit board 240 to be parallel to the YZ plane, it is possible to suppress an increase in the width of the ultrasonic apparatus 200 in the X direction. Further, the circuit board 240 is disposed closer to the first side surface portion 321 than the midpoint between the first side surface portion 321 and the second side surface portion 322. That is, the circuit board 240 is disposed between the first side surface portion 321 and the midpoint between the first side surface portion 321 and the second side surface portion 322.

This circuit board 240 is coupled to the first ultrasonic sensor 210 and the second ultrasonic sensor 220, and includes a first control circuit 241, a second control circuit 242, and a determination circuit 243 as shown in FIG. 2. The first control circuit 241 outputs, to the first ultrasonic sensor 210, a drive signal for transmitting ultrasonic waves from the first ultrasonic sensor 210. In addition, the first control circuit 241 receives a reception signal output from the first ultrasonic sensor 210 when the first ultrasonic sensor 210 receives an ultrasonic wave, and performs signal processing such as amplification processing. Further, the first control circuit 241 calculates a first distance, which is the distance between the first ultrasonic sensor 210 and the sheet 1, based on the time from the transmission timing of ultrasonic waves to the reception timing of ultrasonic waves in the first ultrasonic sensor 210.

The second control circuit 242 outputs, to the second ultrasonic sensor 220, a drive signal for transmitting ultrasonic waves from the second ultrasonic sensor 220. In addition, the second control circuit 242 receives a reception signal output from the second ultrasonic sensor 220 when the second ultrasonic sensor 220 receives an ultrasonic wave, and performs signal processing such as amplification processing. Further, the second control circuit 242 calculates a second distance, which is the distance between the second ultrasonic sensor 220 and the sheet 1, based on the time from the transmission timing of ultrasonic waves to the reception timing of ultrasonic waves in the second ultrasonic sensor 220.

The determination circuit 243 corresponds to an error output portion according to the present disclosure, and determines whether the difference between the first distance calculated by the first control circuit 241 and the second distance calculated by the second control circuit is within a predetermined threshold value. Then, the determination circuit 243 outputs an error signal to the controller 160 when the difference between the first distance and the second distance exceeds the threshold value. That is, when the difference between the first distance and the second distance is large, there is a possibility that an abnormality such as wrinkles has occurred in the sheet 1, and therefore an error signal indicating this possibility is output to the controller 160.

Configuration of Protective Members 251 and 252 and Holders 261 and 262

Figure 7:
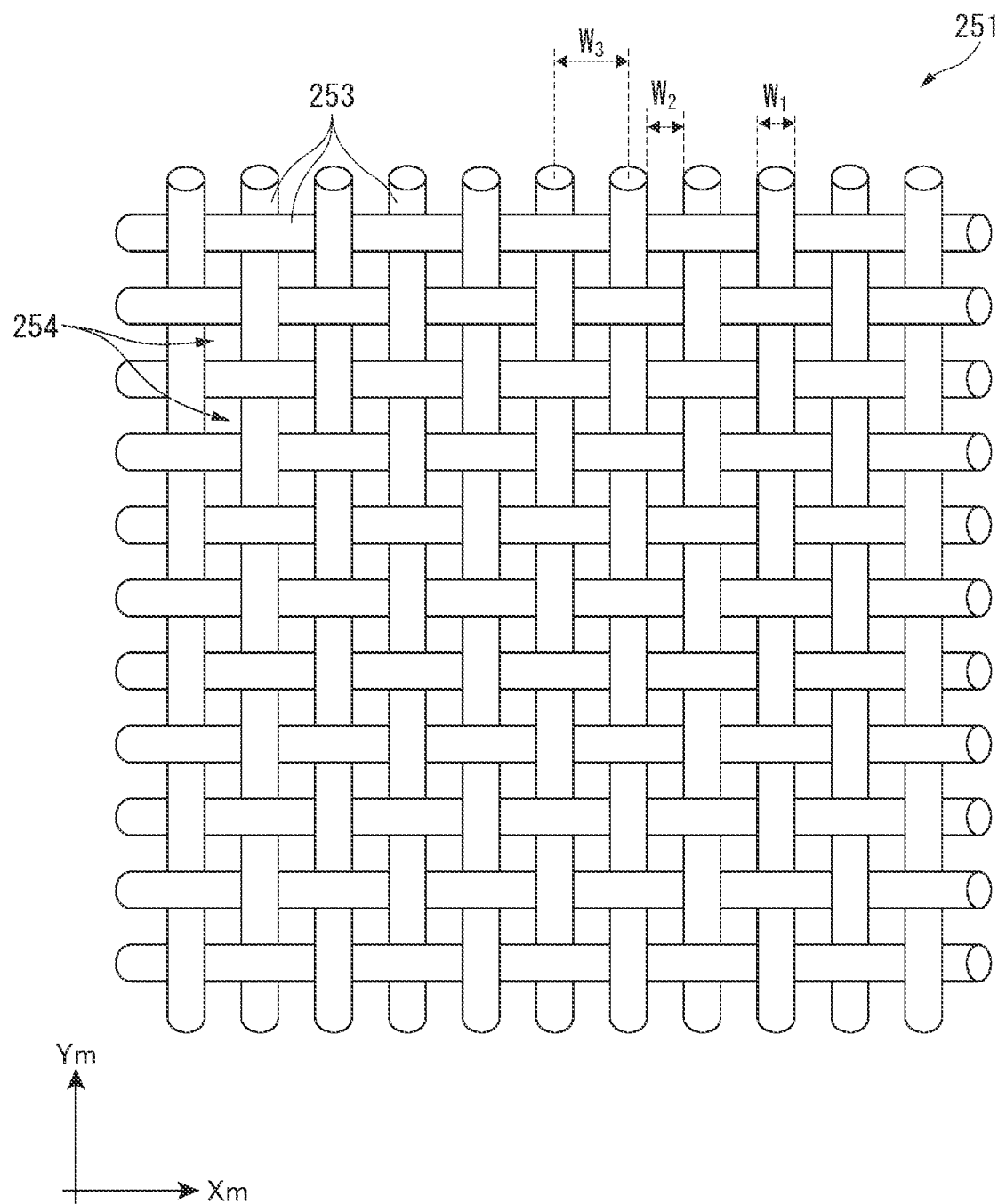
FIG. 7 is a view showing a schematic configuration of a first protective member of the first embodiment.

FIG. 7 is a view showing a schematic configuration of the first protective member 251. Since the second protective member 252 has the same configuration as the first protective member 251, the description thereof will be omitted here. In FIG. 7, an Xm direction and a Ym direction are directions intersecting with the Z direction, and the normal line of an XmYm plane is inclined at a predetermined angle θ with respect to the Z direction. In the following description, the normal line of the XmYm plane may be referred to as the normal line of the first protective member 251 or the normal line of the second protective member 252. As shown in FIG. 7, a plurality of wire rods 253 having the Xm direction as a line direction are disposed along the Ym direction, and a plurality of wire rods 253 having the Ym direction as a line direction are disposed along the Xm direction, whereby the first protective member 251 is a filter configured in a mesh shape. Although FIG. 7 shows an example in which the Xm direction and the Ym direction intersect at 90°, the present disclosure is not limited thereto, and the angle formed by the Xm direction and the Ym direction may be an angle other than 90°. As the material of the wire rod 253, a metal material such as copper, iron, brass, or SUS, an alloy material, a synthetic resin such as nylon or polyester, or the like can be used. In particular, it is preferable to use a material having conductivity, and in this case, resistance to static electricity and electromagnetic waves can be obtained.

Further, a wire diameter W1 of the wire rod 253 is preferably less than the wavelength of ultrasonic waves. This suppresses the disadvantage that the ultrasonic waves are diffusely reflected by the wire rod 253. In such a first protective member 251, a void 254 surrounded by a pair of wire rods 253 adjacent to each other in the Xm direction and a pair of wire rods 253 adjacent to each other in the Ym direction is formed, and this void corresponds to a first hole portion according to the present disclosure through which ultrasonic waves pass. Similarly, in the second protective member 252, the void 254 surrounded by a pair of wire rods 253 adjacent to each other in the Xm direction and a pair of wire rods 253 adjacent to each other in the Ym direction is formed, and this void corresponds to a second hole portion according to the present disclosure through which ultrasonic waves pass. In the present embodiment, in order to suppress the adhesion of foreign matter such as ink droplets and paper dust to the first ultrasonic sensor 210 and the second ultrasonic sensor 220, it is preferable that the width of the void 254, that is, the distance (open W2) between the adjacent wire rods 253 is set to 1 mm or less.

The distance between the center axes of the wire rods 253 is defined as a pitch W3, and a porosity S is defined by the following (1).

$$S=100\times(W_2/W_3)^2 \quad (1)$$

In the present embodiment, a porosity S is preferably 20% or more. When the distance to the sheet 1 is measured by the first ultrasonic sensor 210 and the second ultrasonic sensor 220, the ultrasonic waves transmitted from the first ultrasonic sensor 210 and the second ultrasonic sensor 220 reach the sheet 1, and the ultrasonic waves reflected by the sheet 1 need to be received by the first ultrasonic sensor 210 and the second ultrasonic sensor 220 again. In this case, when the sound pressure of the received ultrasonic wave decreases, the reception sensitivity of ultrasonic waves decreases, and the reception timing cannot be properly determined. Therefore, in order to suppress the decrease in the sound pressure of ultrasonic waves, it is preferable that the acoustic transmittance of the first protective member 251 and the second protective member 252 be 50% or more. Here, when the porosity S is less than 20%, the acoustic transmittance is less than 50%, and the reception sensitivity decreases. On the other hand, when the porosity S is 20% or more, the acoustic transmittance becomes 50% or more, and it is possible to suppress an excessive decrease in the sound pressure of the received ultrasonic waves.

The first holder 261 is a member for holding the first protective member 251, and is attached to the first engaging portion 304A provided on the holder holding portion 304 of the shield member 300. The second holder 262 is a member that holds the second protective member 252, and is attached to the second engaging portion 304B provided on the holder holding portion 304 of the shield member 300.

As shown in FIGS. 4 and 5, the first holder 261 has a first holding surface 263 for holding the first protective member 251. The first holding surface 263 is a plane inclined with respect to the Z direction, and the first protective member 251 is fixed along the first holding surface 263. Thereby, in the first protective member 251, the surface (first protective surface 251A) facing the first ultrasonic sensor 210 is inclined with respect to the transmission and reception surface 211 of the first ultrasonic sensor 210. That is, the first protective surface 251A is inclined at an angle θ with respect to the Z direction. In addition, the first holding surface 263 is provided with a first passage hole 261A through which ultrasonic waves pass.

The first holding surface 263 provided with the first protective member 251 is inclined so that the distance from the transmission and reception surface 211 of the first ultrasonic sensor 210 increases toward the +X side, for example. As a result, the first protective surface 251A of the first protective member 251 provided on the first holding surface 263 is also inclined so that the distance between the first protective surface 251A and the transmission and reception surface 211 increases toward the +X side.

The same applies to the second holder 262, and the second holder 262 has a second holding surface 264 for holding the second protective member 252 as shown in FIG. 4. The second holding surface 264 is provided with a second passage hole 262A that allows ultrasonic waves to pass therethrough. Although not shown in FIG. 5, the second holding surface 264 of the second holder 262 is, for example, a plane inclined with respect to the Z direction, like the first holding surface 263, and the distance from the transmission and reception surface 221 of the second ultrasonic sensor 220 is inclined so as to increase toward the +X side. As a result, the surface (second protective surface 252A) of the second protective member 252 provided on the second holding surface 264 of the second holder 262 facing the second ultrasonic sensor 220 also inclines so that the distance between the second protective surface 252A and the transmission and reception surface 221 increases toward the +X side.

Positional Relationship Between Transmission and Reception Surfaces 211 and 221 and Opening Windows 331 and 332

Figure 8:
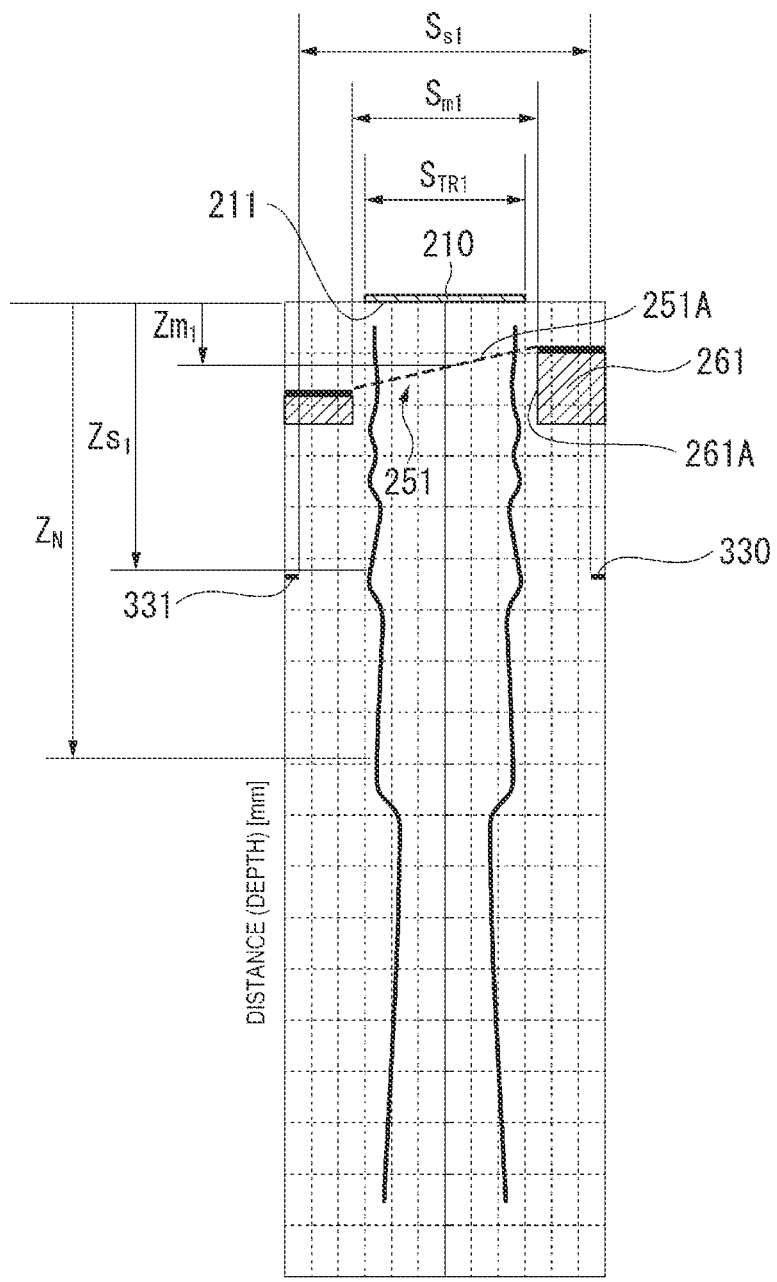
FIG. 8 is a view showing positions of a transmission and reception surface of a first ultrasonic sensor, a first opening window, a first protective member, and a shape of an ultrasonic beam.
Figure 9:
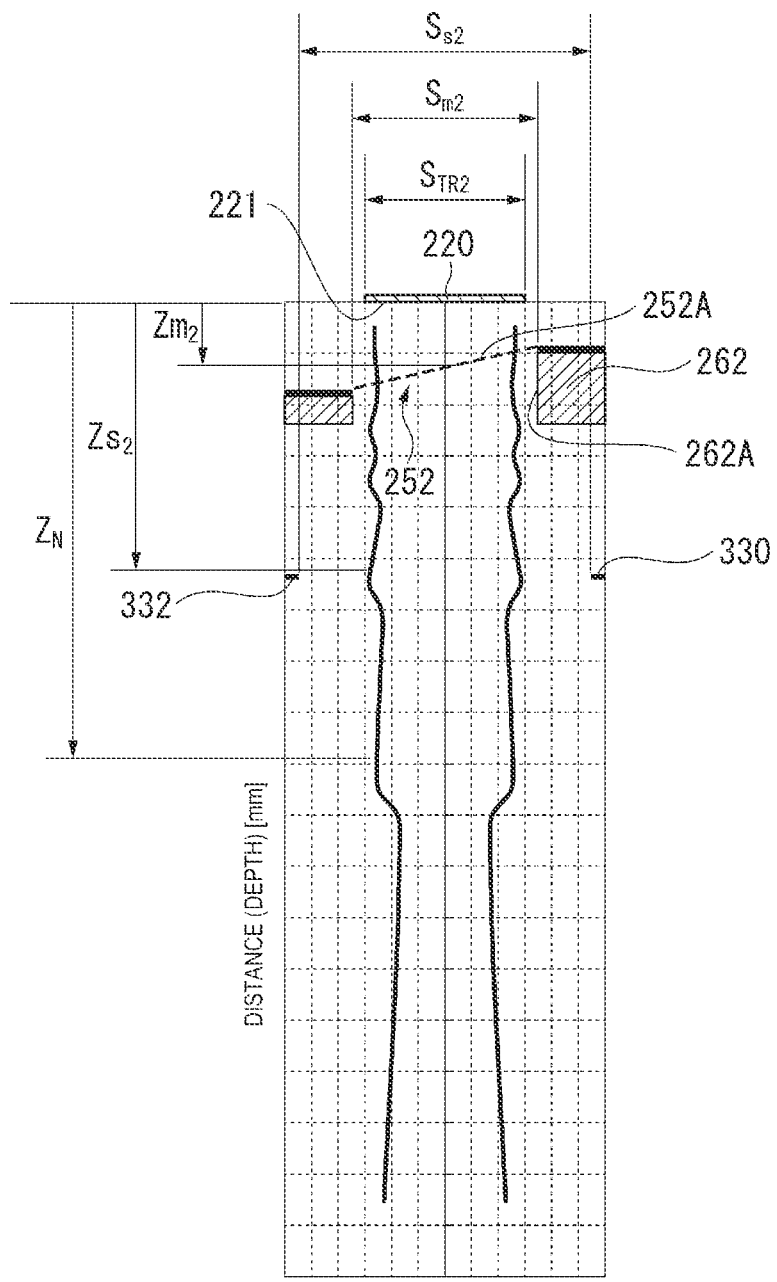
FIG. 9 is a view showing positions of a transmission and reception surface of a second ultrasonic sensor, a second opening window, a second protective member, and a shape of an ultrasonic beam.

FIG. 8 is a view showing the positions of the transmission and reception surface 211 of the first ultrasonic sensor 210, the first opening window 331, and the first protective member 251, and the shape of the ultrasonic beam, and FIG. 9 is a view showing the positions of the transmission and reception surface 221, the second opening window 332, and the second protective member 252 of the second ultrasonic sensor 220, and the shape of the ultrasonic beam. As shown in FIG. 8, in the ultrasonic apparatus 200 of the present embodiment, a distance $Z_{S1}$ between the transmission and reception surface 211 of the first ultrasonic sensor 210 and the first opening window 331 of the shield member 300 is shorter than a near-field limit distance $Z_N$ of the ultrasonic waves transmitted from the first ultrasonic sensor 210. Therefore, the first protective member 251 is provided within the near-field limit distance $Z_N$. Further, it is preferable that the distance from the first ultrasonic sensor 210 to the platen 11 is in the vicinity of the near-field limit distance $Z_N$. As a result, ultrasonic waves with high sound pressure can be applied to the sheet 1 disposed on the platen 11, and an S/N ratio of the received signal can be improved.

Further, as shown in FIG. 8, a width $S_{TR1}$ of the transmission and reception surface 211 of the first ultrasonic sensor 210, an opening size $S_{S1}$ of the first opening window 331, and an opening dimension $S_{m1}$ when the first passage hole 261A of the first holder 261 is projected on the XY plane satisfy the relationship of $S_{TR1} \leq S_{m1} \leq S_{S1}$, and more preferably $S_{TR1} < S_{m1} < S_{S1}$.

The same applies to the second ultrasonic sensor 220, the second opening window 332, and the second passage hole 262A, as shown in FIG. 9. That is, the distance $Z_{S2}$ between the transmission and reception surface 221 of the second ultrasonic sensor 220 and the second opening window 332 is shorter than the near-field limit distance $Z_N$ of the ultrasonic waves transmitted from the second ultrasonic sensor 220, and the second protective member 252 is provided within the near-field limit distance $Z_N$. In the present embodiment, $Z_{S1}=Z_{S2}$, but the distance $Z_{S1}$ between the first ultrasonic sensor 210 and the first opening window 331 and the distance $Z_{S2}$ between the second ultrasonic sensor 220 and the second opening window 332 may be a different distance. Further, it is preferable that the distance between the second ultrasonic sensor 220 and the platen 11 is in the vicinity of the near-field limit distance $Z_N$. Further, the width $S_{TR2}$ of the transmission and reception surface 221 of the second ultrasonic sensor 220, the opening size $S_{S2}$ of the second opening window 332, and the opening size $S_{m2}$ when the second passage hole is projected on the XY plane satisfy the relationship of $S_{TR2} \leq S_{m2} \leq S_{S2}$, and more preferably $S_{TR2} < S_{m2} < S_{S2}$.

As described above, in the present embodiment, the distance $Z_{S1}$ from the first ultrasonic sensor 210 to the first opening window 331 and the distance $Z_{S2}$ from the second ultrasonic sensor 220 to the second opening window 332 are shorter than the near-field limit distance $Z_N$. Within this near-field limit distance $Z_N$, the beam diameter of the ultrasonic waves is approximately the same as the widths $S_{TR1}$ and $S_{TR2}$ of the transmission and reception surfaces 211 and 221 as shown in FIGS. 8 and 9. Therefore, as described above, by setting the relationship of $S_{TR1} \leq S_{m1} \leq S_{S1}$ and $S_{TR2} \leq S_{m2} \leq S_{S2}$, the reflection of ultrasonic waves on the first holder 261 and the second holder 262 and the reflection on the bottom surface portion 330 can be suppressed. Further, as the shield member 300, in the configuration in which the bottom surface portion 330 is attachable to and detachable from the shield main body portion including the top surface portion 310 and the side surface portions 321 to 324, after the ultrasonic sensors 210 and 220, the circuit board 240, and the like are provided inside the shield main body portion, the bottom surface portion 330 is attached to the shield main body portion. With such a configuration, the first opening window 331 and the second opening window 332 are easily affected by the positional balance during assembly of the ultrasonic apparatus 200, and it is difficult to adjust the alignment when the bottom surface portion 330 is attached. On the other hand, by setting $S_{TR1} < S_{m1} < S_{S1}$ and $S_{TR2} < S_{m2} < S_{S2}$, it is easy to adjust the alignment when attaching the bottom surface portion 330 to the shield body, and the positions of the first opening window 331 and the second opening window 332 can be suppressed from deviating from the position where the ultrasonic beam is formed.

Configuration for Suppressing Multiple Reflection of Ultrasonic Waves

Figure 10:
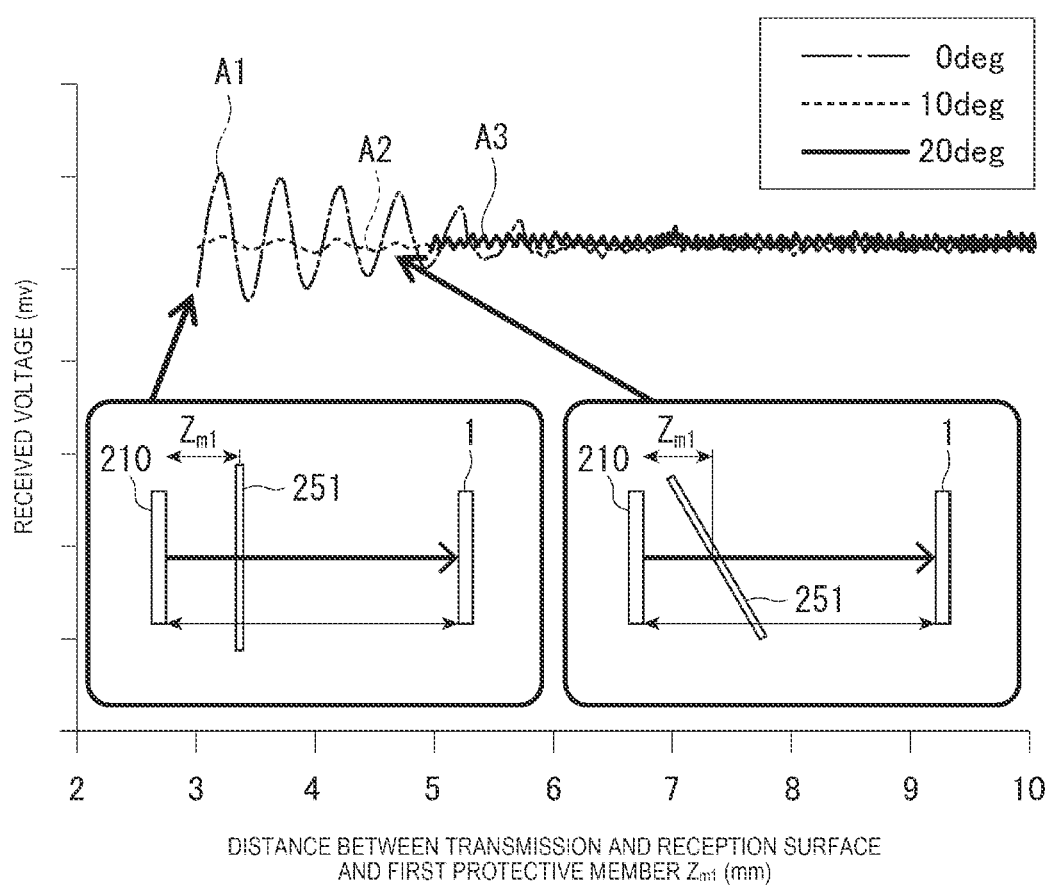
FIG. 10 is a view showing changes in a voltage value of a received signal when a distance from the first ultrasonic sensor to the first protective member is changed in a plurality of patterns in which a disposition angle of the first protective member is changed.

Next, the influence of multiple reflection by the first protective member 251 will be described. Since the second protective member 252 has the same configuration as the first protective member 251, the description here will be omitted or simplified. FIG. 10 is a view showing changes in the voltage value of the received signal when the distance $Z_{m1}$ from the transmission and reception surface 211 to the first protective member 251 is changed, in a plurality of patterns in which the disposition angle of the first protective member 251 is changed. In FIG. 10, the angle formed between the normal line of the first protective surface 251A and the Z direction is changed into three patterns of 0°, 10°, and 20°, and in each case, the distance $Z_{m1}$ between the first ultrasonic sensor 210 and the first protective member 251 is changed between 3 mm and 10 mm. In FIG. 10, a signal A1 is a received signal when the normal line of the first protective surface 251A and the Z direction are parallel to each other. A signal A2 is a received signal when the first angle θ formed between the normal line of the first protective surface 251A and the Z direction is 10°. A signal A3 is a received signal when the first angle θ formed between the normal line of the first protective surface 251A and the Z direction is 20°. The display of the signal A3 when the distance $Z_{m1}$ is changed from 3 mm to 5 mm is omitted in consideration of the visibility of the signal A2, but the same waveform as after 5 mm is obtained.

When the normal line of the first protective surface 251A and the Z direction are parallel to each other, if the distance $Z_{m1}$ is changed as shown by the signal A1 in FIG. 10, the voltage value (received voltage) of the received signal fluctuates greatly. That is, when the relationship between the distance $Z_{m1}$ and a wavelength λ of the ultrasonic wave is $Z_m = m \times \lambda/2$ (where m is an integer), the ultrasonic waves due to the multiple reflection components strengthen each other, and when the relationship between a distance $L_1$ and the wavelength λ of the ultrasonic wave is the distance $Z_{m1} = \{(2m+1)/4\} \times \lambda$, the ultrasonic waves due to the multiple reflection components weaken each other. As described above, when the variation in the voltage value of the received signal becomes large when the distance $Z_{m1}$ is changed, it means that the multiple reflection component of the ultrasonic wave is received by the first ultrasonic sensor 210. In such a case, it is difficult to accurately detect the reception timing of the ultrasonic wave reflected by the sheet 1 due to the noise component of the ultrasonic wave that is multiply reflected.

On the other hand, when the first angle θ is set to 10° or more like the signals A2 and A3, the variation of the received signal when the distance $Z_{m1}$ is changed becomes small. This means that the multiple reflection component of the ultrasonic wave received by the first ultrasonic sensor 210 is reduced. That is, by increasing the first angle θ, noise due to multiple reflection components can be suppressed, and the reception timing of the ultrasonic waves reflected by the sheet 1 can be accurately detected.

Figure 11:
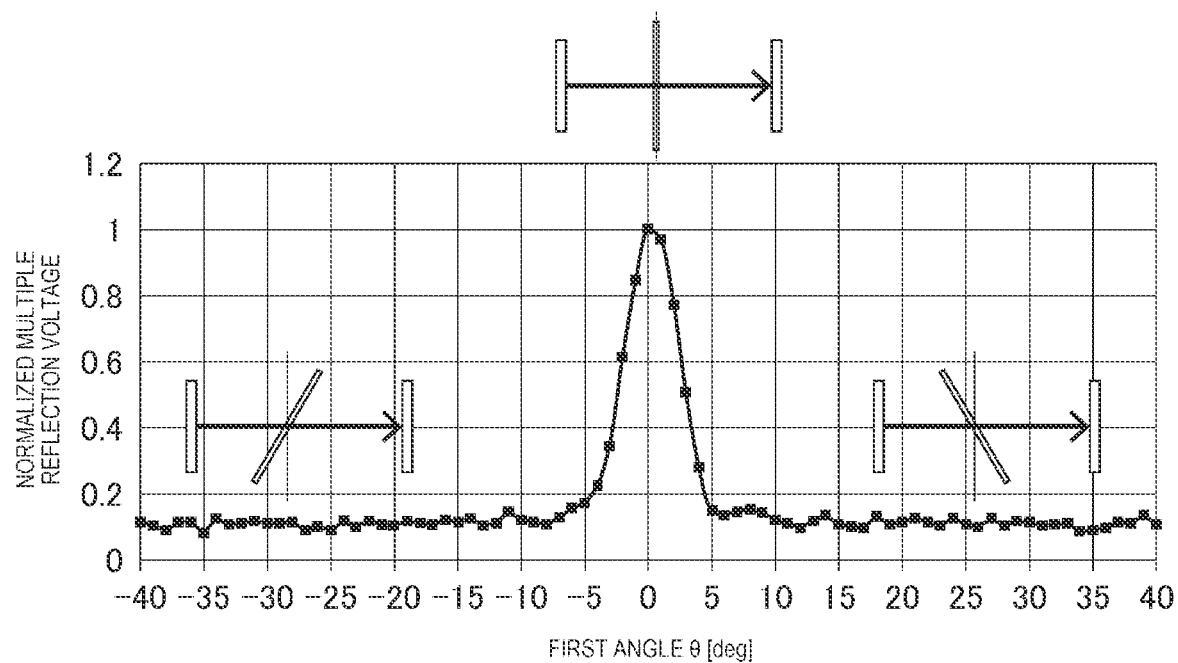
FIG. 11 is a view showing measurement results of a magnitude of a received signal when the first ultrasonic sensor receives ultrasonic waves having multiple reflection components, measured by changing the angle of the first protective member.

FIG. 11 shows the measurement result of the magnitude of the received signal when the first ultrasonic sensor 210 receives the ultrasonic wave of the multiple reflection component, which is measured by changing the first angle θ of the first protective member 251. As shown in FIG. 11, when the first angle θ formed between the normal line of the first protective surface 251A and the Z direction is increased, the voltage value of the received signal decreases.

In order to suppress the deterioration of the detection accuracy of the reception timing due to the multiple reflection, it is preferable to set the inclination angle of the first protective member 251 so that at least the voltage value of the received signal due to the multiple reflection becomes equal to or less than the half value of the received voltage when the first angle θ is 0°. In this case, as shown in FIG. 11, by setting the first angle θ to 5° or more, the voltage value of the received signal can be equal to or less than the half value of the received signal when θ=0°, regardless of the distance $Z_{m1}$.

Figure 12:
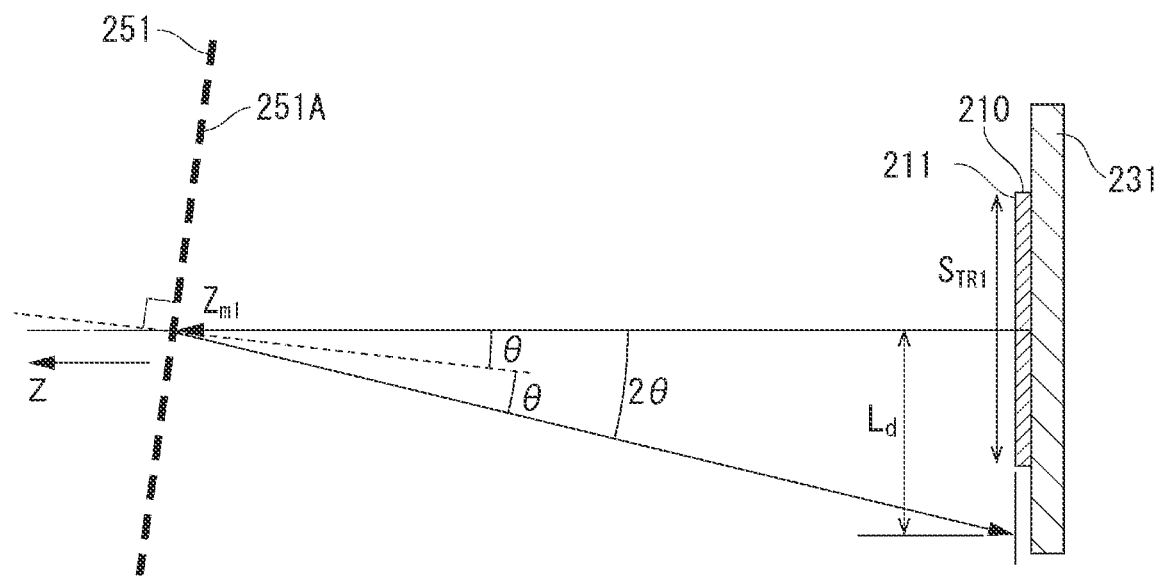
FIG. 12 is a view showing a positional relationship between the first protective member and the first ultrasonic sensor.

Considering the strengthening or weakening of the ultrasonic waves due to the multiple reflection components described above, it is more preferable that the first angle θ of the first protective member 251 is 10° or more. FIG. 12 is a view showing a positional relationship between the first protective member 251 and the first ultrasonic sensor 210. In FIG. 12, the distance $Z_{m1}$ between the first ultrasonic sensor 210 and the first protective member 251 is the distance between the center point of the transmission and reception surface 211 of the first ultrasonic sensor 210 and the center point of the first protective member 251. When the ultrasonic wave transmitted from the center point of the transmission and reception surface 211 in the Z direction is reflected by the first protective member 251, the reflected ultrasonic wave is input at a position separated from the center point of the transmission and reception surface 211 by a distance $L_d=Z_{m1}\cdot\tan(2\theta)$ in the same plane as the transmission and reception surface 211.

Therefore, in order to prevent the ultrasonic waves reflected by the first protective member 251 from being received by the first ultrasonic sensor 210, it is preferable to set the position and the inclination angle of the first protective member 251 so that the relationship between the width $S_{TR1}$ of the transmission and reception surface 211 and the distance $L_d$ is $S_{TR1}/2<L_d$. That is, it is preferable that the positional relationship between the width $S_{TR1}$ of the transmission and reception surface 211 of the first ultrasonic sensor 210 and the first protective member 251 satisfies $S_{TR1}<2Z_{m1}\cdot\tan(2\theta)$. It is more preferable to satisfy the positional relationship between the width $S_{TR1}$ of the transmission and reception surface 211 of the first ultrasonic sensor 210 and the first protective member 251 satisfies $S_{TR1}<L_d$, that is, $S_{TR1}<Z_{m1}\cdot\tan(2\theta)$. In this case, it is possible to further suppress the disadvantage that the ultrasonic wave transmitted from the first ultrasonic sensor 210 is reflected by the first protective member 251 and enters the transmission and reception surface 211.

The above relationship also holds for the second ultrasonic sensor 220 and the second protective member 252. Therefore, it is preferable that the positional relationship between the width $S_{TR2}$ of the transmission and reception surface 221 of the second ultrasonic sensor 220 and the second protective member 252 satisfies $S_{TR2}<Z_{m2}\cdot\tan(2\theta)$, and it is more preferable to satisfy $S_{TR2}<Z_{m2}\cdot\tan(2\theta)$.

Further, in the embodiment, as shown in FIG. 5, the first protective surface 251A to which the ultrasonic wave from the first ultrasonic sensor 210 is input is inclined so as to face the second side surface portion 322. That is, assuming that distance between any first point on the first protective surface 251A and the transmission and reception surface 211 is L1, and the distance between the transmission and reception surface 211 and a second point on the +X side farther from the circuit board 240 than the first point is L2, L1<L2 is satisfied. In other words, the first protective member 251 is inclined so that the ultrasonic wave transmitted from the first ultrasonic sensor 210 in the Z direction is reflected by the first protective surface 251A toward the second side surface portion 322.

Although not shown in FIG. 5, the second protective member 252 is also the same, and the second protective surface 252A to which the ultrasonic wave from the second ultrasonic sensor 220 is input is inclined so as to face the second side surface portion 322. That is, assuming that the distance between any third point on the second protective surface 252A and the transmission and reception surface 221 is L3, and the distance between a fourth point on the +X side farther from the circuit board 240 than the third point and the transmission and reception surface 221 is L4, L3<L4 is satisfied. In other words, the second protective member 252 is inclined so that the ultrasonic wave transmitted from the second ultrasonic sensor 220 in the Z direction is reflected by the second protective surface 252A toward the second side surface portion 322.

As a result, it is possible to suppress the disadvantage that the ultrasonic wave transmitted from the first ultrasonic sensor 210 and reflected by the first protective member 251 is reflected by the circuit board 240. That is, in the present embodiment, as described above, as shown in FIG. 5, the first ultrasonic sensor 210 and the second ultrasonic sensor 220 are provided at a midpoint of the shield inner space from the first side surface portion 321 to the second side surface portion 322. On the other hand, the circuit board 240 is disposed so as to be closer to the first side surface portion 321 than the midpoint of the shield inner space from the first side surface portion 321 to the second side surface portion 322, and to be parallel to the first side surface portion 321 and the second side surface portion 322. Therefore, the distance between the first ultrasonic sensor 210 and the second ultrasonic sensor 220 and the second side surface portion 322 is greater than the distance between the first ultrasonic sensor 210 and the second ultrasonic sensor 220 and the circuit board 240.

Here, the case where the ultrasonic waves transmitted from the first ultrasonic sensor 210 and the second ultrasonic sensor 220 are reflected toward the circuit board 240 by the first protective member 251 and the second protective member 252 and the case where the ultrasonic waves are reflected on the second side surface portion 322 side will be compared. The circuit board 240 is disposed closer to the first ultrasonic sensor 210 and the second ultrasonic sensor 220 than the second side surface portion 322. Therefore, in the former case, when the ultrasonic waves are reflected toward the circuit board 240, a large amount of the ultrasonic waves re-reflected by the circuit board 240 are input to the first ultrasonic sensor 210 and the second ultrasonic sensor 220, and the received signal has a lot of noise. On the other hand, in the latter, even when the ultrasonic waves are re-reflected by the second side surface portion 322, the amount of ultrasonic waves input to the first ultrasonic sensor 210 and the second ultrasonic sensor 220 is smaller than that of the former, and the noise included in the received signal is also small.

Configuration of Controller 160

As shown in FIG. 2, the controller 160 includes an arithmetic portion 161 configured by a CPU (Central Processing Unit) and the like, and a storage portion 162 configured by a recording circuit such as a memory. The controller 160 is coupled to the supplier 110, the transporter 120, the heater 130, the printer 141, the movement mechanism 150, and the ultrasonic apparatus 200, and controls the overall operation of the printing apparatus 100. The controller 160 is coupled to an interface portion (not shown), and is coupled to an external apparatus such as a personal computer via the interface portion. Then, the controller 160 receives the image data input from the external apparatus, controls each portion of the printing apparatus 100, and forms an image on the sheet 1 based on the image data.

The storage portion 162 records various data for controlling the printing apparatus 100 and various programs. The arithmetic portion 161 functions as a first controller 163, a detector 164, a second controller 165, and the like by reading and executing various programs stored in the storage portion 162, as shown in FIG. 2.

The first controller 163 controls the supplier 110 and the transporter 120 to transport the sheet 1 so that the predetermined position of the sheet 1 is located on the platen 11. The first controller 163 also controls the movement mechanism 150 to move the carriage 140 and the ultrasonic apparatus 200 to a predetermined position on the platen 11.

The detector 164 commands the ultrasonic apparatus 200 to perform ultrasonic measurement, and detects the occurrence of wrinkles based on the error signal from the ultrasonic apparatus 200. The detection apparatus according to the present disclosure is configured by the ultrasonic apparatus 200 and the function as the detector 164 of the arithmetic portion 161. Here, the method for detecting wrinkles in the present embodiment will be described in detail. As shown in FIG. 2, in the ultrasonic apparatus 200 of the present embodiment, the first ultrasonic sensor 210 is disposed in the downstream and the second ultrasonic sensor 220 is disposed in the upstream along the Y direction, which is the transport direction of the sheet 1. Further, since the ultrasonic apparatus 200 is fixed to the carriage 140, the ultrasonic apparatus 200 can also be moved in the X direction by moving the carriage 140 by the movement mechanism 150. Therefore, the first ultrasonic sensor 210 can perform ultrasonic wave transmission and reception processing at each position along the X direction in the downstream in the transport direction. Further, the second ultrasonic sensor 220 can perform ultrasonic wave transmission and reception processing at each position along the X direction in the upstream in the transport direction. Accordingly, the first control circuit 241 can calculate the first distance from the first ultrasonic sensor 210 to the sheet 1 at the downstream in the transport direction and at each position along the X direction, and the second control circuit 242 can calculate the second distance from the second ultrasonic sensor 220 to the sheet 1 at the upstream in the transport direction and at each position along the X direction. Further, the determination circuit 243 calculates the difference between the first distance and the second distance at each position in the X direction, and outputs an error signal when the difference exceeds a threshold value.

Therefore, when no error signal is input from the ultrasonic apparatus 200, the detector 164 can determine that wrinkles are not detected in the sheet 1 at each position in the X direction, and can detect wrinkles in the sheet 1 in any position in the X direction when an error signal is input from the ultrasonic apparatus 200.

Figure 13:
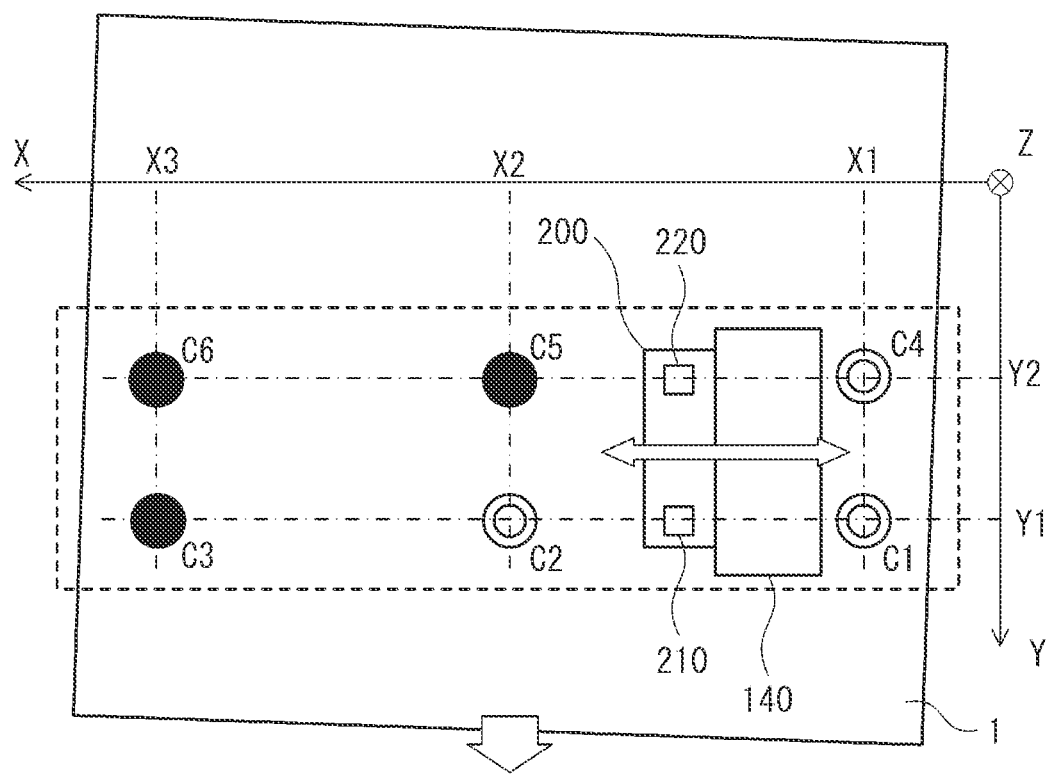
FIG. 13 is a view showing an example of wrinkles on a sheet detected by a detector.
Figure 14:
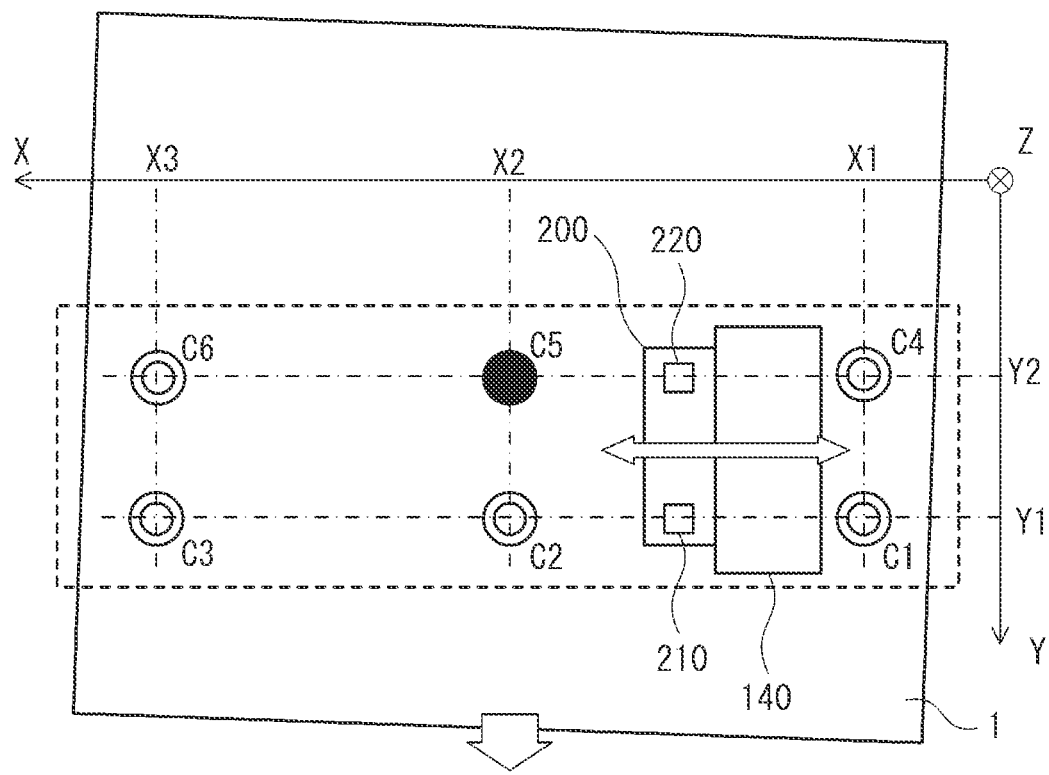
FIG. 14 is a view showing another example of the wrinkles on the sheet detected by the detector.
Figure 15:
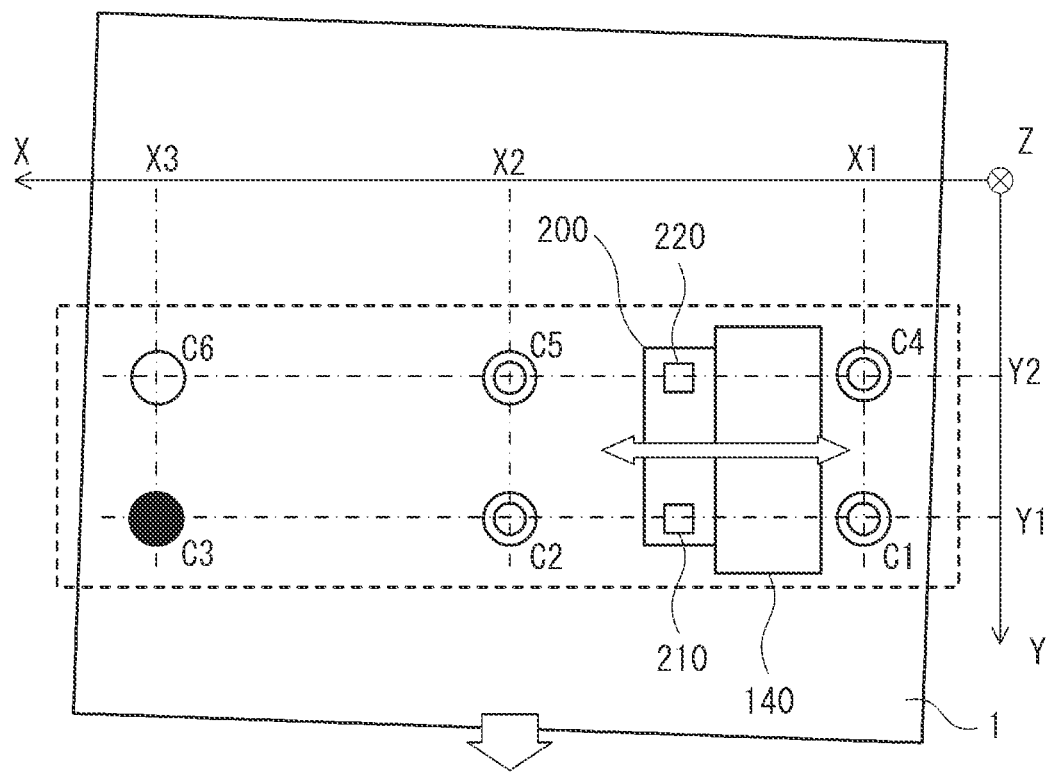
FIG. 15 is a view showing another example of the wrinkles on the sheet detected by the detector.

FIGS. 13 to 15 are views showing examples of wrinkles in the sheet 1 detected by the detector 164. FIGS. 13 to 15 show the amount wrinkles occurring in the sheet 1 with respect to the six locations C1(X1, Y1), C2(X2, Y1), C3(X3, Y1), C4(X1, Y2), C5(X2, Y2), and C6(X3, Y2), and black circles indicate locations with many wrinkles, white circles indicate locations with medium wrinkles, and double circles indicate locations with few wrinkles. For example, in the example of FIG. 13, this is a wrinkle that occurs when the ±X side edge of the sheet 1 is inclined with respect to the Y direction, which is the transport direction. Originally, the ±X edge of the sheet 1 is transported in a state of being parallel to the Y direction as shown in FIG. 13. However, as shown in FIG. 13, when the ±X side edge of the sheet 1 is inclined with respect to the Y direction due to impact or the like, and the sheet 1 is transported in the Y direction as it is, wrinkles (serpentine wrinkles) occur on the sheet 1 at the positions of C5 and C6 in the upstream in the Y direction and the positions of C3 in the downstream. In this case, for example, the occurrence of wrinkles cannot be detected only at the position of C1. On the other hand, in the present embodiment, the detector 164 can detect wrinkles because an error signal is output from the ultrasonic apparatus 200 when the ultrasonic apparatus 200 is moved to the position of X2.

The wrinkles on the sheet 1 may change depending on the type of the sheet 1. For example, FIG. 14 shows an example of wrinkles when a wallpaper for a sign display is used as the sheet 1, and in this example, wrinkles occur only at the position of C5. Therefore, the detector 164 can detect wrinkles because the ultrasonic apparatus 200 outputs an error signal when the ultrasonic apparatus 200 is moved to the position of X2. Further, the example of FIG. 15 is an example of wrinkles when a woven fabric for a banner, which is also used as a banner, is used as the sheet, and many wrinkles occur at the position of C3, and medium wrinkles occur at the position of C6. Therefore, the detector 164 can detect wrinkles because the ultrasonic apparatus 200 outputs an error signal when the ultrasonic apparatus 200 is moved to the position of X3.

FIGS. 13 to 15 show examples of serpentine wrinkles, but the wrinkles that occur on the sheet 1 include, for example, wrinkles that occur when the sheet 1 is left in a high humidity environment, swelling wrinkles that occur when the sheet 1 made of a material having high rigidity and shrinkability is used, and wrinkles caused by the sticking of the sheet 1 due to static electricity, wrinkles that occur when the end surface of the roll paper floats up when roll paper is used as the sheet 1, and the like. Since it is a wrinkle that causes unevenness on the surface of the sheet 1, the wrinkles left alone change the first distance and the second distance due to unevenness at a plurality of locations along the X direction, and an error signal is output. Since wrinkles in which part of the sheet rises occur, an error signal is output from the ultrasonic apparatus 200 in the swelling wrinkles at the raised location. When sticking occurs due to static electricity, the ultrasonic apparatus 200 outputs an error signal at the position where the sticking occurs. The wrinkles occurred by the floating of the end surface of the roll paper cause an error signal to be output from the ultrasonic apparatus 200 at the location where the roll paper floats. Therefore, in the present embodiment, the detector 164 can suitably detect wrinkles with respect to any of the above wrinkles.

The second controller 165 controls the printer 141 to form an image on the sheet 1 when no wrinkles are detected by the detector 164. Specifically, the second controller 165 forms an image on the sheet 1 in cooperation with the first controller 163. That is, in the printing apparatus 100, when image data is input from an external apparatus or the like, the first controller 163 transports the sheet 1 so that the image formation position of the sheet 1 is located on the platen 11 based on the image data and moves the carriage 140 in the X direction. Then, when the carriage is moved to the position based on the image data, the second controller 165 ejects ink of the color based on the image data to the image formation position to form dots. By repeating the above processing, the first controller 163 and the second controller 165 form an image on the sheet 1. Further, the second controller 165 suspends the image forming processing when the detector 164 detects wrinkles during the formation of the image. This suppresses the disadvantage of wasted ink.

Operational Effects of Present Embodiment

The printing apparatus 100 of the present embodiment includes an ultrasonic apparatus 200. The ultrasonic apparatus 200 includes a first ultrasonic sensor 210, a second ultrasonic sensor 220, and a circuit board 240. The first ultrasonic sensor 210 and the second ultrasonic sensor 220 transmit ultrasonic waves to the sheet 1, which is an object, and receive ultrasonic waves reflected by the sheet 1. The circuit board 240 includes a first control circuit 241, a second control circuit 242, and a determination circuit 243. The first control circuit 241 calculates the first distance between the first ultrasonic sensor 210 and the sheet 1 based on the time from the transmission timing of the ultrasonic waves obtained by the transmission and reception processing of the ultrasonic waves using the first ultrasonic sensor 210 to the reception timing, and the speed of sound. The second control circuit 242 calculates the second distance between the second ultrasonic sensor 220 and the sheet 1 based on the time from the transmission timing of the ultrasonic waves obtained by the transmission and reception processing of the ultrasonic waves using the second ultrasonic sensor 220 to the reception timing, and the speed of sound. The determination circuit 243 determines whether the difference between the first distance and the second distance is equal to or greater than a threshold value, and outputs an error signal when the difference is equal to or greater than the threshold value.

With such a configuration, the ultrasonic apparatus 200 calculates the distance from the sheet 1 at a plurality of locations on the sheet 1, and outputs an error signal when the first distance and the second distance have a difference equal to or greater than the threshold value based on the distances calculated at the plurality of locations. Therefore, the wrinkles can be determined with higher accuracy than in the case where the presence or absence of wrinkles is determined by the ultrasonic wave transmission and reception processing for a single location on the sheet 1.

The ultrasonic apparatus 200 of the present embodiment further includes the conductive shield member 300 in which the first ultrasonic sensor 210 and the second ultrasonic sensor 220 are provided. The shield member 300 includes the first opening window 331 provided between the first ultrasonic sensor 210 and the sheet 1 transported to the platen 11. The shield member 300 also includes the second opening window 332 provided between the second ultrasonic sensor 220 and the sheet 1 transported to the platen 11.

Therefore, the first ultrasonic sensor 210 and the second ultrasonic sensor 220 are surrounded by the conductive shield member, thereby protecting the first ultrasonic sensor 210 and the second ultrasonic sensor 220 from external electromagnetic waves. Therefore, it is possible to suppress the disadvantage that the noise signal due to the electromagnetic wave is superimposed on the received signals output from the first ultrasonic sensor 210 and the second ultrasonic sensor 220. Further, by providing the first opening window 331 and the second opening window 332, the shield member 300 does not hinder the transmission and reception of ultrasonic waves between the first ultrasonic sensor 210 and the sheet 1, and the transmission and reception of ultrasonic waves between the second ultrasonic sensor 220 and the sheet 1.

In the ultrasonic apparatus 200 of the present embodiment, the distance $Z_{S1}$ between the first opening window 331 and the transmission and reception surface 211 of the first ultrasonic sensor 210 is shorter than the near-field limit distance $Z_N$ of the first ultrasonic sensor 210. The distance $Z_{S2}$ between the second opening window 332 and the transmission and reception surface 221 of the second ultrasonic sensor 220 is shorter than the near-field limit distance $Z_N$ of the second ultrasonic sensor 220. That is, in the present embodiment, the first opening window 331 is provided within the near-field limit distance $Z_N$ from the transmission and reception surface 211, and the second opening window 332 is provided within the near-field limit distance $Z_N$ from the transmission and reception surface 221.

As a result, it is possible to apply an ultrasonic wave having a strong sound pressure in the vicinity of the near-field limit distance $Z_N$ to the sheet 1 from the first ultrasonic sensor 210 and the second ultrasonic sensor 220, and to improve the S/N ratio in ultrasonic wave transmission and reception processing.

In the ultrasonic apparatus 200 of the present embodiment, the circuit board 240 is provided inside the shield member 300. Therefore, it is possible to suppress the influence of external electromagnetic waves on the circuit board 240, and it is possible to suppress deterioration in accuracy of ultrasonic wave transmission and reception processing due to noise.

In the ultrasonic apparatus 200 of the embodiment, the shield member 300 includes the first side surface portion 321 that is parallel to the YZ plane including the Y direction in which the first ultrasonic sensor 210 and the second ultrasonic sensor 220 are arranged, and the Z direction in which ultrasonic waves are transmitted and received by the first ultrasonic sensor 210 and the second ultrasonic sensor 220, and the second side surface portion 322 facing the first side surface portion 321. The circuit board 240 is disposed such that the projected area of the circuit board 240 projected on the YZ plane is 70% or more of the area of the circuit board 240. Accordingly, in the ultrasonic apparatus 200, the ultrasonic apparatus 200 can be downsized as compared with the case where the circuit board 240 is disposed parallel to the XZ plane or the XY plane.

In the present embodiment, the circuit board 240 is disposed closer to the first side surface portion 321 than the midpoint between the first side surface portion 321 and the second side surface portion 322. Further, between the first opening window 331 and the first ultrasonic sensor 210, the first protective member 251 having the first protective surface 251A provided with a plurality of first hole portions (voids 254) through which ultrasonic waves pass is provided. Further, between the second opening window 332 and the second ultrasonic sensor 220, the second protective member 252 having the second protective surface 252A provided with a plurality of second hole portions (voids 254) through which ultrasonic waves pass is provided. The first protective surface 251A is inclined to a direction in which the ultrasonic wave transmitted from the first ultrasonic sensor 210 is reflected toward the second side surface portion 322 with respect to the ultrasonic wave transmission and reception surface 211 of the first ultrasonic sensor 210. The second protective surface 252A is inclined to a direction in which the ultrasonic wave transmitted from the second ultrasonic sensor 220 is reflected toward the second side surface portion 322 with respect to the ultrasonic wave transmission and reception surface 221 of the second ultrasonic sensor 220.

As a result, with the first protective member 251 and the second protective member 252, it is possible to suppress the entry of foreign matter such as ink droplets and paper dust into the inside of the shield member 300, and it is possible to suppress adhesion of foreign matter to the first ultrasonic sensor 210 and the second ultrasonic sensor 220. Therefore, it is possible to suppress the deterioration of the performance of the first ultrasonic sensor 210 or the second ultrasonic sensor 220, that is, the decrease in the sound pressure of the transmitted ultrasonic wave and the decrease in the reception sensitivity of the ultrasonic wave. Further, since the first protective surface 251A is inclined with respect to the transmission and reception surface 211 of the first ultrasonic sensor 210, it is possible to suppress the disadvantage that ultrasonic waves are multiply reflected between the first ultrasonic sensor 210 and the first protective member 251. Similarly, since the second protective surface 252A is inclined with respect to the transmission and reception surface 221 of the second ultrasonic sensor 220, it is possible to suppress the disadvantage that ultrasonic waves are multiply reflected between the second ultrasonic sensor 220 and the second protective member 252. Accordingly, the ultrasonic apparatus 200 can suppress the disadvantage that a noise signal due to the occurrence of multiple reflection is superimposed on a received signal, and the first control circuit 241 and the second control circuit 242 can accurately calculate the first distance and the second distance. Further, part of the ultrasonic waves transmitted from the first ultrasonic sensor 210 and the second ultrasonic sensor 220 is reflected toward the second side surface portion 322 by the first protective surface 251A and the second protective surface 252A. As a result, it is possible to suppress the disadvantage that the ultrasonic waves that are noise components are input to the first ultrasonic sensor 210 and the second ultrasonic sensor 220. That is, when the ultrasonic waves reflected by the first protective surface 251A and the second protective surface 252A travel toward the circuit board 240 that is close to the first ultrasonic sensor 210 and the second ultrasonic sensor 220, most of the ultrasonic waves re-reflected by the circuit board 240 enter the first ultrasonic sensor 210 and the second ultrasonic sensor 220. Since this ultrasonic wave is not the ultrasonic wave reflected by the sheet 1, the ultrasonic wave becomes a noise component. On the other hand, in the present embodiment, part of the ultrasonic waves transmitted from the first ultrasonic sensor 210 and the second ultrasonic sensor 220 is reflected by the first protective surface 251A and the second protective surface 252A toward the second side surface portion 322 that is farther from the first ultrasonic sensor 210 and the second ultrasonic sensor 220 than the circuit board 240. Therefore, compared to the case where the ultrasonic waves are reflected by the circuit board 240, the amount of ultrasonic waves reflected by the second side surface portion 322 and input to the first ultrasonic sensor 210 and the second ultrasonic sensor 220 is reduced. Therefore, the ultrasonic apparatus 200 can suppress a decrease in the S/N ratio of the received signal, and can perform ultrasonic wave transmission and reception processing with high accuracy.

The ultrasonic apparatus 200 of the present embodiment includes the first holder 261 to which the first protective member 251 is attached and the second holder 262 to which the second protective member 252 is attached. The first holder 261 and the second holder 262 are detachably provided on the holder holding portion 304 of the shield member 300. Therefore, when the first protective member 251 and the second protective member 252 are replaced, the first holder 261 and the second holder 262 can be easily removed from the shield member 300, and the ultrasonic apparatus 200 can be easily maintained.

In the ultrasonic apparatus 200 of the present embodiment, the first holder 261 includes the first passage hole 261A through which the ultrasonic waves that passed through the first protective member 251 pass, and the second holder 262 includes the second passage hole 262A through which the ultrasonic waves that passed through the second protective member 252 pass. The opening size $S_{S1}$ of the first opening window 331, the opening size $S_{m1}$ of the first passage hole 261A, and the width $S_{TR1}$ of the transmission and reception surface 211 of the first ultrasonic sensor 210 satisfy the relationship of $S_{TR1} \leq S_{m1} \leq S_{S1}$. In addition, the opening size $S_{S2}$ of the second opening window 332, the opening size $S_{m2}$ of the second passage hole 262A, and the width $S_{TR2}$ of the transmission and reception surface 221 of the second ultrasonic sensor 220 satisfy the relationship of $S_{TR2} \leq S_{m2} \leq S_{S2}$. Thereby, the ultrasonic waves transmitted from the first ultrasonic sensor 210 and the second ultrasonic sensor 220 are not reflected by the first holder 261, the second holder 262, and the shield member 300, and multiple reflection can be suppressed. Further, since it is possible to suppress the decrease in the sound pressure of the ultrasonic wave used for the measurement, it is possible to improve the S/N ratio of the received signal.

The printing apparatus 100 of the present embodiment includes the ultrasonic apparatus 200 and the controller 160. Then, the controller 160 functions as the detector 164 that detects wrinkles, which is one of the abnormalities of the sheet 1, based on the error signal output from the ultrasonic apparatus 200. Accordingly, the printing apparatus 100 can detect the wrinkles occurring on the sheet 1 based on the error signal output from the ultrasonic apparatus 200.

The printing apparatus 100 according to the present embodiment includes a transporter 120 that transports the sheet 1 along the Y direction which is the transport direction. The second ultrasonic sensor 220 provided in the ultrasonic apparatus 200 is disposed in the upstream in the Y direction with respect to the disposition position of the first ultrasonic sensor 210. That is, the first ultrasonic sensor 210 and the second ultrasonic sensor 220 are disposed side by side along the Y direction. As a result, the printing apparatus 100 can suitably detect wrinkles that occur only in the upstream in the transport direction of the sheet 1 and wrinkles that occur only in the downstream. Accordingly, for example, wrinkles of the sheet 1 having various patterns as shown in FIGS. 13 to 15 can be detected.

The printing apparatus 100 of the present embodiment includes the movement mechanism 150 for moving the ultrasonic apparatus 200 in the X direction intersecting with the Y direction. Accordingly, by moving the first ultrasonic sensor 210 and the second ultrasonic sensor 220 disposed side by side in the Y direction in the X direction, ultrasonic waves can be scanned along the X direction, and wrinkles can be detected over a wide area of the sheet 1.

The printing apparatus 100 of the present embodiment includes a printer 141 that forms an image on the sheet 1, and the first controller 163 and the second controller 165 control printing by the printer 141 based on the wrinkle detection result by the detector 164. As a result, when the sheet 1 has wrinkles, printing can be interrupted, thereby suppressing ink consumption for printing.

Second Embodiment

In the above-described first embodiment, in the ultrasonic apparatus 200, an example in which the first protective member 251 and the second protective member 252 are inclined so as to reflect ultrasonic waves toward the second side surface portion 322 on which the circuit board 240 is not disposed has been shown. On the other hand, in the ultrasonic apparatus 200 of the second embodiment, the inclination directions of the first protective member 251 and the second protective member 252 differ from those of the first embodiment. In the following description, the same reference numerals will be given to the configurations already described, and the description thereof will be omitted or simplified.

Figure 16:
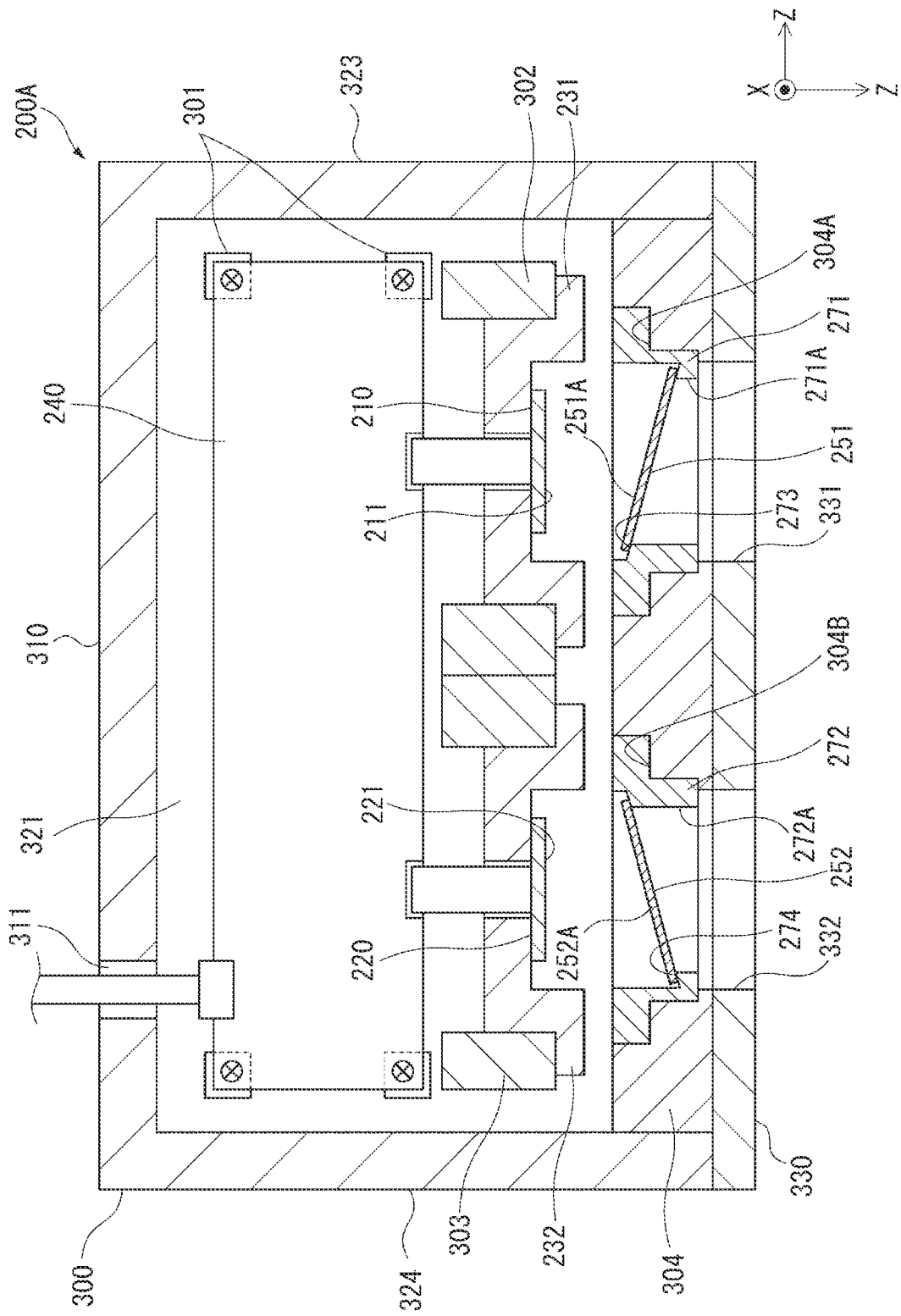
FIG. 16 is a cross-sectional view showing a schematic configuration of an ultrasonic apparatus according to a second embodiment.

FIG. 16 is a cross-sectional view of an ultrasonic apparatus 200A of the second embodiment taken along the YZ plane. As shown in FIG. 16, the ultrasonic apparatus 200A of the present embodiment includes a first ultrasonic sensor 210, a second ultrasonic sensor 220, a first pedestal portion 231, a second pedestal portion 232, a circuit board 240, a first protective member 251, a second protective member 252, a first holder 271, a second holder 272, and a shield member 300. The first ultrasonic sensor 210 is fixed to the first pedestal portion 231 as in the first embodiment. Then, by fixing the first pedestal portion 231 to the shield member 300, the first ultrasonic sensor 210 is provided inside the shield member 300 so as to face the first opening window 331. The second ultrasonic sensor 220 is fixed to the second pedestal portion 232 as in the first embodiment. Then, by fixing the second pedestal portion 232 to the shield member 300, the second ultrasonic sensor 220 is provided inside the shield member 300 so as to face the second opening window 332. Similar to the first embodiment, the circuit board 240 is disposed parallel to the first side surface portion 321 and the second side surface portion 322, and closer to the first side surface portion 321 than the midpoint between the first side surface portion 321 and the second side surface portion 322.

The first protective member 251 is fixed to the first holding surface 273 of the first holder 271. The first holding surface 273 of the first holder 271 is provided with a first passage hole 271A penetrating in the Z direction. Then, the first holder 271 is engaged with the first engaging portion 304A provided in the holder holding portion 304 of the shield member 300, as in the first embodiment. Accordingly, the first protective member 251 is disposed between the first ultrasonic sensor 210 and the first opening window 331. The second protective member 252 is fixed to the second holding surface 274 of the second holder 272. The second holding surface 274 of the second holder 272 is provided with a second passage hole 272A penetrating in the Z direction. Then, the second holder 272 is engaged with the second engaging portion 304B provided in the holder holding portion 304 of the shield member 300, as in the second embodiment. Accordingly, the second protective member 252 is disposed between the second ultrasonic sensor 220 and the second opening window 332.

Here, in the present embodiment, the first protective member 251 held by the first holding surface 273 of the first holder 271 is inclined so that the distance from the transmission and reception surface 211 of the first ultrasonic sensor 210 increases toward the +Y side. That is, when the distance between any fifth point of the first protective surface 251A and the transmission and reception surface 211 is L5, and the distance between a sixth point on the +Y side farther from the second ultrasonic sensor 220 than the fifth point and the transmission and reception surface 211 is L6, L5<L6 is satisfied. In other words, the first protective member 251 is inclined so that the ultrasonic wave transmitted from the first ultrasonic sensor 210 in the Z direction is reflected by the first protective surface 251A toward the third side surface portion 323 opposite to the second ultrasonic sensor 220.

The second protective member 252 held by the second holding surface 274 of the second holder 272 is inclined so that the distance between the second protective surface 252A and the transmission and reception surface 221 increases toward the −Y side. That is, when the distance between any seventh point of the second protective surface 252A and the transmission and reception surface 221 is L7, and the distance between an eighth point on the Y side farther from the first ultrasonic sensor 210 than the seventh point and the transmission and reception surface 221 is L8, L7<L8 is satisfied. In other words, the second protective member 252 is inclined so that the ultrasonic waves transmitted from the second ultrasonic sensor 220 in the Z direction are reflected by the second protective surface 252A toward the fourth side surface portion 324 opposite to the first ultrasonic sensor 210.

Thus, in the present embodiment, it is possible to suppress the disadvantage that the ultrasonic waves transmitted from the first ultrasonic sensor 210 are input to the second ultrasonic sensor 220, and the ultrasonic waves transmitted from the second ultrasonic sensor 220 are input to the first ultrasonic sensor 210.

Operational Effects of Present Embodiment

The present embodiment has the same operational effects as the first embodiment, and further has the following operational effects. In the ultrasonic apparatus 200 of the present embodiment, the first protective surface 251A of the first protective member 251 is inclined with respect to the transmission and reception surface 211 of the first ultrasonic sensor 210 so as to reflect the ultrasonic waves transmitted from the first ultrasonic sensor in a direction away from the second ultrasonic sensor 220. Further, the second protective surface 252A of the second protective member 252 is inclined with respect to the transmission and reception surface 221 of the second ultrasonic sensor 220 so as to reflect the ultrasonic waves transmitted from the second ultrasonic sensor 220 in a direction away from the first ultrasonic sensor 210. For this reason, even when the ultrasonic wave transmitted from the first ultrasonic sensor 210 is reflected by the first protective member 251, the input of the reflected ultrasonic wave to the second ultrasonic sensor 220 can be suppressed. Further, even when the ultrasonic wave transmitted from the second ultrasonic sensor 220 is reflected by the second protective member 252, the input of the reflected ultrasonic wave to the first ultrasonic sensor 210 can be suppressed. This suppresses the disadvantage that the received signal contains noise, and the circuit board 240 can accurately calculate the first distance and the second distance.

MODIFICATION EXAMPLE

The present disclosure is not limited to the above-described embodiments, and modifications, improvements, or the like within the scope of achieving the object of the present disclosure are included in the present disclosure.

Modification Example 1

In the first embodiment and the second embodiment, an example in which two ultrasonic sensors, the first ultrasonic sensor 210 and the second ultrasonic sensor 220, are provided along the Y direction has been shown, but the present disclosure is not limited thereto. For example, three or more ultrasonic sensors may be provided along the Y direction. In this case, the circuit board 240 is provided with a sensor control circuit for each ultrasonic sensor. Each sensor control circuit causes the corresponding ultrasonic sensor to perform ultrasonic wave transmission and reception processing, and calculates the distance from the ultrasonic sensor to the sheet 1 based on the transmission and reception result. In addition, the determination circuit 243 outputs an error signal when any one of the distances between the ultrasonic sensors and the sheet 1 has a difference having the threshold value or more with respect to the distance measured by another ultrasonic sensor.

A plurality of ultrasonic sensors may be provided along the X direction, or a plurality of ultrasonic sensors may be provided in each of the Y direction and the X direction. In the case where a large number of ultrasonic sensors are disposed along each of the X direction and the Y direction, a movement mechanism for moving the ultrasonic apparatus may not be required.

Modification Example 2

In the first and second embodiments described above, the rectangular parallelepiped shield member 300 having the top surface portion 310, the side surface portions 321 to 324, and the bottom surface portion 330 is illustrated, but the configuration of the shield member is not limited thereto. For example, the shield member may be formed in another shape such as a cylindrical shape.

Modification Example 3

In the first embodiment and the second embodiment described above, a configuration in which the first ultrasonic sensor 210, the second ultrasonic sensor 220, and the circuit board 240 are provided inside one shield member 300 has been illustrated, but for example, the configuration may include a first shield member in which the first ultrasonic sensor 210 is provided, a second shield member in which the second ultrasonic sensor 220 is provided, and a third shield member in which the circuit board 240 is provided.

Modification Example 4

Although the ultrasonic apparatus 200 is fixed to the carriage 140 in the first and second embodiments, the ultrasonic apparatus 200 may be provided separately from the carriage 140. In this case, it is preferable to separately provide a second movement mechanism for moving the ultrasonic apparatus 200 in the X direction.

Modification Example 5

In the above-described first and second embodiments, an example in which the printing apparatus 100 also functions as a detection apparatus including the ultrasonic apparatus 200 has been shown, but the present disclosure is not limited thereto. For example, an image scanner or the like that captures an image printed on a sheet that is an object as image data may be configured to include the detection apparatus. In such an image scanner, in order to read the image on the sheet, the sheet is transported to the image reading position, and image reading processing is performed by the scanner at the image reading position. At this time, when the sheet has wrinkles at the image reading position, the image cannot be properly captured, and the wrinkles are reflected in the captured image. Therefore, the ultrasonic apparatus according to the present disclosure may be incorporated in such an image scanner to detect wrinkles on the sheet at the image reading position.

Modification Example 6

In the above-described first and second embodiments, the detection apparatus that detects the wrinkles of an object as an abnormality by using the ultrasonic apparatus 200 is illustrated, but the disclosure is not limited thereto. For example, the ultrasonic apparatus 200 may be incorporated in a distance measuring apparatus that measures the distance to the object. In this case, when an error signal is output from the circuit board of the ultrasonic apparatus 200, the distance measuring apparatus determines that the distance measuring accuracy is low and stops the measurement. When an error signal is not output, the distance measuring apparatus outputs the average of the first distance and the second distance as the distance between the ultrasonic apparatus and the object.

Modification Example 7

In the first and second embodiments, an example in which the width $S_{TR1}$ of the transmission and reception surface 211 of the first ultrasonic sensor 210, the opening size $S_{S1}$ of the first opening window 331, and the opening size $S_{m1}$ of the first passage hole 261A satisfy the relationship of $S_{TR1} \geq S_{m1} \leq S_{S1}$ has been shown, but the present disclosure is not limited thereto. For example, a plurality of ultrasonic transducers Tr constituting the first ultrasonic sensor 210 may be driven independently of each other, and the circuit board 240 may control the drive timing of each ultrasonic transducer Tr to form an ultrasonic beam that converges at a predetermined focus position. In this case, by controlling the first ultrasonic sensor 210 so that the platen 11 is at the focus position, the beam diameter of the ultrasonic waves becomes smaller toward the platen 11. Therefore, the first opening window 331 and the first passage hole 261A may be provided so as to satisfy $S_{TR1} \geq S_{m1} \geq S_{S1}$. The relationship between the width $S_{TR2}$ of the transmission and reception surface 221 of the second ultrasonic sensor 220, the opening size $S_{S2}$ of the second opening window 332, and the opening size $S_{m2}$ of the second passage hole 262A is the same.

Modification Example 8

In the first and second embodiments described above, an example in which the relationship between the distance $Z_{S1}$ between the transmission and reception surface 211 of the first ultrasonic sensor 210 and the first opening window 331 and the near-field limit distance $Z_N$ of the ultrasonic waves transmitted from the first ultrasonic sensor 210 satisfies $Z_{S1} < Z_N$ has been shown.

On the other hand, $Z_{S1} = Z_N$ may be set. In the case of long-distance sound waves, the sound pressure distribution in the beam cross section of an ultrasonic beam becomes a distribution in which the sound pressure becomes weaker toward the periphery around the transmission center axis of the ultrasonic wave, that is, a simple sound pressure distribution. Therefore, when the sound pressure of the ultrasonic waves transmitted from the first ultrasonic sensor 210 is sufficiently large and the sound pressure in the far field can be maintained above a predetermined value, the distance $Z_{S1}$ between the first opening window 331 and the transmission and reception surface 211 of the first ultrasonic sensor 210 may have the same dimension as the near-field limit distance $Z_N$, or may be longer than the near-field limit distance $Z_N$. The same applies to the distance between the second ultrasonic sensor 220 and the second opening window 332.

Modification Example 9

In the first embodiment and the second embodiment, the configuration in which the first protective member 251 is held by the first holder 261 and the second protective member 252 is held by the second holder 262 has been exemplified, but the first protective member 251 and the second protective member 252 may be directly fixed to the vicinity of the first opening window 331 and the second opening window 332 of the shield member 300.

Also, an example is shown in which the first holders 261 and 271, and the second holders 262 and 272 are detachably attached to the holder holding portion 304 of the shield member 300, but the first holders 261 and 271, and the second holders 262 and 272 may be fixed to the holder holding portion 304.

Modification Example 10

Although the circuit board 240 is provided parallel to the first side surface portion 321 and the second side surface portion 322 and in the vicinity of the first side surface portion 321, the present disclosure is not limited thereto. For example, the circuit board 240 may be provided at a midpoint between the first side surface portion 321 and the second side surface portion 322. Further, as described in Modification Example 1, when the plurality of ultrasonic sensors are disposed along the X direction, the circuit board 240 is disposed parallel to the third side surface portion 323 and the fourth side surface portion 324. Further, when the plurality of ultrasonic sensors are disposed in an array along the X direction and the Y direction, the circuit board 240 may be disposed in the vicinity of the top surface portion 310 and parallel to the top surface portion 310.

Overview of the Disclosure

According to the first aspect, there is provided an ultrasonic apparatus including a first ultrasonic sensor that transmits an ultrasonic wave to an object and receives the ultrasonic wave reflected by the object, a second ultrasonic sensor that transmits an ultrasonic wave to the object and receives the ultrasonic wave reflected by the object, an error output portion that outputs an error signal when the difference between a first distance between the first ultrasonic sensor and the object calculated based on ultrasonic wave transmission and reception processing using the first ultrasonic sensor and a second distance between the second ultrasonic sensor and the object calculated based on ultrasonic wave transmission and reception processing using the second ultrasonic sensor is equal to or greater than a threshold value.

As a result, the ultrasonic apparatus can detect an abnormality in an object and output an error signal by performing ultrasonic wave transmission and reception processing at a plurality of positions of the object. In this case, by transmitting the ultrasonic waves to one location of the object, it is possible to determine an abnormality more accurately than the ultrasonic apparatus of related art that detects an abnormality of the object.

The ultrasonic apparatus of the first aspect further includes a conductive shield member in which the first ultrasonic sensor and the second ultrasonic sensor are provided, and it is preferable that the shield member includes a first opening window and a second opening window, the first opening window is provided between the first ultrasonic sensor and the object, and the second opening window is provided between the second ultrasonic sensor and the object.

As a result, the ultrasonic apparatus can apply an ultrasonic wave having a strong sound pressure in the vicinity of the near-field limit distance to the object from the first ultrasonic sensor and the second ultrasonic sensor, and can improve the S/N ratio in the ultrasonic wave transmission and reception processing.

In the ultrasonic apparatus of this aspect, it is preferable that a distance between the first opening window and a transmission and reception surface of the first ultrasonic sensor is shorter than a near-field limit distance of the first ultrasonic sensor, and a distance between the second opening window and a transmission and reception surface of the second ultrasonic sensor is shorter than a near-field limit distance of the second ultrasonic sensor.

As a result, the ultrasonic apparatus can apply an ultrasonic wave having a strong sound pressure in the vicinity of the near-field limit distance to the object from the first ultrasonic sensor and the second ultrasonic sensor, and can improve the S/N ratio in the ultrasonic wave transmission and reception processing.

The ultrasonic apparatus according to the present aspect includes the circuit board that is provided with the error output portion, and it is preferable that the circuit board is provided inside the shield member. Therefore, the ultrasonic apparatus can suppress the influence of external electromagnetic waves on the circuit board, and can suppress deterioration in the accuracy of ultrasonic wave transmission and reception processing due to noise.

In the ultrasonic apparatus according to the present aspect, it is preferable that the shield member includes a first side surface portion parallel to a plane including a first direction in which the first ultrasonic sensor and the second ultrasonic sensor are arranged, and a transmission and reception direction of ultrasonic waves in which ultrasonic waves are transmitted from the first ultrasonic sensor and the second ultrasonic sensor, and a second side surface portion facing the first side surface portion, the circuit board is disposed closer to the first side surface portion than a midpoint between the first side surface portion and the second side surface portion, a first protective member having a first protective surface provided with a plurality of first hole portions for passing ultrasonic waves is provided between the first opening window and the first ultrasonic sensor, a second protective member having a second protective surface provided with a plurality of second hole portions for passing ultrasonic waves is provided between the second opening window and the second ultrasonic sensor, the first protective surface is inclined with respect to the transmission and reception surface of the first ultrasonic sensor in a direction in which ultrasonic waves transmitted from the first ultrasonic sensor are reflected toward the second side surface portion, and the second protective surface is inclined with respect to the transmission and reception surface of the second ultrasonic sensor in a direction in which ultrasonic waves transmitted from the second ultrasonic sensor are reflected toward the second side surface portion.

As a result, the first ultrasonic sensor and the second ultrasonic sensor can be protected by the first protective member and the second protective member. That is, it is possible to suppress the entry of foreign matter into the inside of the shield member through the first opening window and the second opening window, and to prevent the foreign matter from adhering to the first ultrasonic sensor and the second ultrasonic sensor. In addition, when such a first protective member or a second protective member is provided, part of the ultrasonic waves transmitted from the first ultrasonic sensor and the second ultrasonic sensor is reflected by the first protective surface and the second protective surface. Here, in the present aspect, the circuit board is disposed closer to the first side surface portion than the midpoint between the first side surface portion and the second side surface portion. Then, part of the ultrasonic waves reflected by the first protective surface and the second protective surface is reflected toward the second side surface portion opposite to the first side surface portion where the circuit board is disposed in close proximity. With such a configuration, it is possible to suppress the disadvantage that part of the ultrasonic waves reflected by the first protective surface and the second protective surface is multiply reflected in the shield and returns to the ultrasonic sensor. That is, when part of the ultrasonic waves reflected by the first protective surface or the second protective surface is directed to the first side surface portion, the ultrasonic waves are reflected on the circuit board disposed closer to the first ultrasonic sensor and the second ultrasonic sensor than the first side surface portion. In this case, the amount of ultrasonic components that are re-reflected by the circuit board and enter the ultrasonic sensor increases. On the other hand, the second side surface portion is farther from the first ultrasonic sensor and the second ultrasonic sensor than the circuit board. Therefore, even if the ultrasonic waves are re-reflected on the second side surface portion, compared to the case where the ultrasonic waves are re-reflected on the circuit board, the ultrasonic component entering the first ultrasonic sensor or the second ultrasonic sensor can be reduced. Therefore, it is possible to suppress an increase in noise due to an unnecessary reflected ultrasonic wave component, and it is possible to suppress a decrease in the S/N ratio of the received signal.

In the ultrasonic apparatus according to the present aspect, it is preferable that the shield member includes a first side surface portion parallel to a plane including a first direction in which the first ultrasonic sensor and the second ultrasonic sensor are arranged, and a transmission and reception direction of ultrasonic waves in which ultrasonic waves are transmitted from the first ultrasonic sensor and the second ultrasonic sensor, and a second side surface portion facing the first side surface portion, and the projected area of the circuit board onto the plane is 70% or more of the area of the circuit board. That is, it is preferable that the angle formed by the board surface of the circuit board and the plane parallel to the first side surface portion and the second side surface portion is 0° or more and 45° or less. This makes it possible to reduce the size of the ultrasonic apparatus as compared with the case where the circuit board is disposed orthogonal to the direction in which the first ultrasonic sensor and the second ultrasonic sensor are disposed.

In the ultrasonic apparatus of the present aspect, it is preferable that a first protective member having a plurality of first hole portions for passing ultrasonic waves is provided between the first opening window and the first ultrasonic sensor, and a second protective member having a plurality of second hole portions for passing ultrasonic waves is provided between the second opening window and the second ultrasonic sensor.

As a result, the first protective member and the second protective member can suppress the entry of foreign matter such as ink droplets and paper dust into the inside of the shield member, and can suppress adhesion of foreign matter to the first ultrasonic sensor and the second ultrasonic sensor. Therefore, it is possible to suppress the deterioration of the performance of the first ultrasonic sensor and the second ultrasonic sensor, that is, the decrease in the sound pressure of the transmitted ultrasonic wave and the decrease in the reception sensitivity of the ultrasonic wave.

In the ultrasonic apparatus of the present aspect, it is preferable that the first protective member includes a first protective surface provided with the plurality of first hole portions, the first protective surface is inclined with respect to the transmission and reception surface of the first ultrasonic sensor, the second protective member includes a second protective surface provided with the plurality of second hole portions, and the second protective surface is inclined with respect to the transmission and reception surface of the second ultrasonic sensor.

As a result, the ultrasonic apparatus can suppress the disadvantage that ultrasonic waves are multiply reflected between the first ultrasonic sensor and the first protective member, and can suppress the disadvantage that ultrasonic waves are multiply reflected between the second ultrasonic sensor 220 and the second protective member 252. Therefore, the ultrasonic apparatus can suppress the disadvantage that the noise signal due to the occurrence of multiple reflection is superimposed on the received signal, and can accurately calculate the first distance and the second distance based on the ultrasonic wave transmission and reception processing by the first ultrasonic sensor and the second ultrasonic sensor.

In the ultrasonic apparatus of the present aspect, it is preferable that the first protective surface is inclined with respect to the transmission and reception surface of the first ultrasonic sensor so as to reflect the ultrasonic waves transmitted from the first ultrasonic sensor in a direction away from the second ultrasonic sensor, and the second protective surface is inclined with respect to the transmission and reception surface of the second ultrasonic sensor so as to reflect the ultrasonic waves transmitted from the second ultrasonic sensor in a direction away from the first ultrasonic sensor.

As a result, even when the ultrasonic wave transmitted from the first ultrasonic sensor is reflected by the first protective member, it is possible to suppress the disadvantage that the reflected ultrasonic wave is input to the second ultrasonic sensor. Further, even when the ultrasonic wave transmitted from the second ultrasonic sensor is reflected by the second protective member, it is possible to suppress the disadvantage that the reflected ultrasonic wave is input to the first ultrasonic sensor. As a result, the disadvantage that the received signal contains noise can be suppressed, and the measurement accuracy of the ultrasonic apparatus can be improved.

The ultrasonic apparatus according to the present aspect includes a first holder to which the first protective member is attached, and a second holder to which the second protective member is attached, and it is preferable that the first holder and the second holder are detachably attached to the shield member.

Thus, when the first protective member and the second protective member are replaced, the first holder and the second holder can be easily removed from the shield member, and the ultrasonic apparatus can be easily maintained.

In the ultrasonic apparatus 200 according to the present aspect, it is preferable that the first holder includes a first passage hole through which ultrasonic waves that passed through the first protective member pass, the second holder includes a second passage hole through which ultrasonic waves that passed through the second protective member pass, an opening size $S_{S1}$ of the first opening window, an opening size $S_{m1}$ of the first passage hole, and a width $S_{TR1}$ of the transmission and reception surface of the first ultrasonic sensor satisfy $S_{TR1} S_{m1} \leq S_{S1}$, and an opening size $S_{S2}$ of the second opening window, an opening size $S_{m2}$ of the second passage hole, and a width $S_{TR2}$ of the transmission and reception surface of the second ultrasonic sensor satisfy $S_{TR2} \leq S_{m2} \leq S_{S2}$.

As a result, the ultrasonic waves transmitted from the first ultrasonic sensor and the second ultrasonic sensor are not reflected by the first holder, the second holder and the shield member, and multiple reflection can be suppressed. Further, it is possible to suppress a decrease in the sound pressure of ultrasonic waves input to the object, and it is possible to improve the S/N ratio of the received signal.

The detection apparatus of the second aspect includes the ultrasonic apparatus of the first aspect, and a detector that detects an abnormality of the object based on the error signal output from the ultrasonic apparatus. Accordingly, the detection apparatus can detect the abnormality of the object based on the error signal output from the ultrasonic apparatus.

The detection apparatus according to the present aspect includes a transport mechanism for transporting the object along a predetermined transport direction, and it is preferable that the second ultrasonic sensor is disposed on an upstream of a disposition position of the first ultrasonic sensor in the transport direction. Accordingly, the detection apparatus can suitably detect an abnormality that occurs when an object is transported and that occurs only in the upstream in the transport direction, and an abnormality that occurs only in the downstream.

In the detection apparatus according to the present aspect, it is preferable to further include a movement mechanism for moving the ultrasonic apparatus in a direction intersecting with the transport direction. Thereby, by moving the first ultrasonic sensor and the second ultrasonic sensor disposed side by side in the transport direction in a direction intersecting the transport direction, it is possible to detect an abnormality of the object in a wide range.

According to a third aspect, there is provided a printing apparatus that includes a detection apparatus according to the second aspect and a printer that forms an image on the object, and controls printing by the printer based on a detection result of the abnormality by the detector. As a result, when the object has an abnormality such as wrinkles, printing by the printer can be interrupted, thereby suppressing ink consumption for printing.

What is claimed is:

1. An ultrasonic apparatus comprising:
a first ultrasonic sensor that transmits ultrasonic waves to an object and receives the ultrasonic waves reflected by the object;
a second ultrasonic sensor that transmits ultrasonic waves to the object and receives the ultrasonic waves reflected by the object;
a conductive shield member in which the first ultrasonic sensor and the second ultrasonic sensor are provided; and
a determination circuit that outputs an error signal when a difference between a first distance between the first ultrasonic sensor and the object calculated based on ultrasonic wave transmission and reception processing using the first ultrasonic sensor and a second distance between the second ultrasonic sensor and the object calculated based on ultrasonic wave transmission and reception processing using the second ultrasonic sensor is equal to or greater than a threshold value.

2. The ultrasonic apparatus according to claim 1, wherein
the shield member includes a first opening window and a second opening window,
the first opening window is provided between the first ultrasonic sensor and the object, and
the second opening window is provided between the second ultrasonic sensor and the object.

3. The ultrasonic apparatus according to claim 2, wherein
a distance between the first opening window and a transmission and reception surface of the first ultrasonic sensor is shorter than a near-field limit distance of the first ultrasonic sensor, and
a distance between the second opening window and a transmission and reception surface of the second ultrasonic sensor is shorter than a near-field limit distance of the second ultrasonic sensor.

4. The ultrasonic apparatus according to claim 2, further comprising:
a circuit board that is provided with the determination circuit, wherein
the circuit board is provided inside the shield member.

5. The ultrasonic apparatus according to claim 4, wherein
the shield member includes a first side surface portion parallel to a plane including a first direction in which the first ultrasonic sensor and the second ultrasonic sensor are arranged, and a transmission and reception direction of ultrasonic waves in which ultrasonic waves are transmitted from the first ultrasonic sensor and the second ultrasonic sensor, and a second side surface portion facing the first side surface portion,
the circuit board is disposed closer to the first side surface portion than a midpoint between the first side surface portion and the second side surface portion,
a first protective member having a first protective surface provided with a plurality of first hole portions for passing ultrasonic waves is provided between the first opening window and the first ultrasonic sensor,
a second protective member having a second protective surface provided with a plurality of second hole portions for passing ultrasonic waves is provided between the second opening window and the second ultrasonic sensor,
the first protective surface is inclined with respect to the transmission and reception surface of the first ultrasonic sensor in a direction in which ultrasonic waves transmitted from the first ultrasonic sensor are reflected toward the second side surface portion, and
the second protective surface is inclined with respect to the transmission and reception surface of the second ultrasonic sensor in a direction in which ultrasonic waves transmitted from the second ultrasonic sensor are reflected toward the second side surface portion.

6. The ultrasonic apparatus according to claim 4, wherein
the shield member includes a first side surface portion parallel to a plane including a first direction in which the first ultrasonic sensor and the second ultrasonic sensor are arranged, and a transmission and reception direction of ultrasonic waves in which ultrasonic waves are transmitted from the first ultrasonic sensor and the second ultrasonic sensor, and a second side surface portion facing the first side surface portion, and
a projected area of the circuit board onto the plane is 70% or more of an area of the circuit board.

7. The ultrasonic apparatus according to claim 2, wherein
a first protective member having a plurality of first hole portions for passing ultrasonic waves is provided between the first opening window and the first ultrasonic sensor, and
a second protective member having a plurality of second hole portions for passing ultrasonic waves is provided between the second opening window and the second ultrasonic sensor.

8. The ultrasonic apparatus according to claim 7, wherein
the first protective member includes a first protective surface provided with the plurality of first hole portions,
the first protective surface is inclined with respect to a transmission and reception surface of the first ultrasonic sensor,
the second protective member includes a second protective surface provided with the plurality of second hole portions, and
the second protective surface is inclined with respect to a transmission and reception surface of the second ultrasonic sensor.

9. The ultrasonic apparatus according to claim 8, wherein
the first protective surface is inclined with respect to the transmission and reception surface of the first ultrasonic sensor so as to reflect the ultrasonic waves transmitted from the first ultrasonic sensor in a direction away from the second ultrasonic sensor, and the second protective surface is inclined with respect to the transmission and reception surface of the second ultrasonic sensor so as to reflect the ultrasonic waves transmitted from the second ultrasonic sensor in a direction away from the first ultrasonic sensor.

10. The ultrasonic apparatus according to claim 5, further comprising:

a first holder to which the first protective member is attached; and a second holder to which the second protective member is attached, wherein the first holder and the second holder are detachably attached to the shield member.

11. The ultrasonic apparatus according to claim 10, wherein the first holder includes a first passage hole through which ultrasonic waves that passed through the first protective member pass, the second holder includes a second passage hole through which ultrasonic waves that passed through the second protective member pass, $S_{TR1} \leq S_{m1} \leq S_{S1}$, where $S_{S1}$ is an opening size of the first opening window, $S_{m1}$ is an opening size of the first passage hole, and $S_{TR1}$ is a width of the transmission and reception surface of the first ultrasonic sensor, and $S_{TR2} \leq S_{m2} \leq S_{S2}$, where $S_{S2}$ is an opening size of the second opening window, $S_{m2}$ is an opening size of the second passage hole, and $S_{TR2}$ is a width of the transmission and reception surface of the second ultrasonic sensor.

12. A detection apparatus comprising:

the ultrasonic apparatus according to claim 1; and a detector that detects an abnormality of the object based on the error signal output from the ultrasonic apparatus.

13. The detection apparatus according to claim 12, further comprising:

a transport mechanism for transporting the object along a predetermined transport direction, wherein the second ultrasonic sensor is disposed on an upstream of a disposition position of the first ultrasonic sensor in the transport direction.

14. The detection apparatus according to claim 13, further comprising: a movement mechanism for moving the ultrasonic apparatus in a direction intersecting with the transport direction.

15. A printing apparatus comprising:

the detection apparatus according to claim 12; and a printer that forms an image on the object, wherein the printing apparatus controls printing by the printer based on a detection result of the abnormality by the detector.

* * * * *